US012423471B2

(12) United States Patent
Bastien et al.

(10) Patent No.: US 12,423,471 B2
(45) Date of Patent: Sep. 23, 2025

(54) PROGRAM OPERATION SEQUENCE DETERMINATION FOR REDUCED POTENTIAL LEAKAGE OF PERSONALLY IDENTIFIABLE INFORMATION

(71) Applicant: Woven by Toyota, Inc., Tokyo (JP)

(72) Inventors: Jean-François Bastien, Tokyo (JP); Peter Berger, Tokyo (JP)

(73) Assignee: WOVEN BY TOYOTA, INC., Tokyo (JP)

( * ) Notice: Subject to any disclaimer, the term of this patent is extended or adjusted under 35 U.S.C. 154(b) by 265 days.

(21) Appl. No.: 18/349,969

(22) Filed: Jul. 11, 2023

(65) Prior Publication Data
US 2025/0021687 A1    Jan. 16, 2025

(51) Int. Cl.
*G06F 21/62* (2013.01)
*H04L 9/40* (2022.01)
*H04L 67/12* (2022.01)

(52) U.S. Cl.
CPC ............ *G06F 21/6245* (2013.01); *H04L 9/40* (2022.05); *H04L 67/12* (2013.01)

(58) Field of Classification Search
CPC ...... G06F 21/60; G06F 21/62; G06F 21/6218; G06F 21/6245; H04L 9/40; H04L 67/01; H04L 67/12
See application file for complete search history.

(56) References Cited

U.S. PATENT DOCUMENTS

| | | |
|---|---|---|
| 2017/0177798 A1 | 6/2017 | Samuel et al. |
| 2017/0193172 A1* | 7/2017 | Melle ................ G16H 10/60 |
| 2021/0004486 A1 | 1/2021 | Adams et al. |
| 2021/0136121 A1* | 5/2021 | Crabtree ............ H04L 63/1433 |
| 2022/0021660 A1 | 1/2022 | Trieflinger et al. |
| 2022/0100889 A1* | 3/2022 | Tan ................ G06F 21/6245 |
| 2023/0153461 A1* | 5/2023 | Kalra ................ G06F 21/6245 726/27 |
| 2024/0070319 A1* | 2/2024 | Cai ................ G06F 21/6245 |

* cited by examiner

*Primary Examiner* — D'Arcy Winston Straub
(74) *Attorney, Agent, or Firm* — HAUPTMAN HAM, LLP

(57) ABSTRACT

Program operation sequence determination for reduced potential leakage of personally identifiable information is performed by identifying a plurality of candidate program operations for capturing a data sample including first class information and second class information and reducing the second class information of the data sample, assigning a leakage cost representing potential leakage of personally identifiable information associated with each valid combination of a candidate program operation among the plurality of candidate program operations and a computational resource among a plurality of computational resources, and applying an objective function to the valid combinations and assigned leakage costs to determine a sequence of program operations, wherein each program operation of the sequence is performed by one or more selected computational resources such that the sum leakage cost is below a threshold leakage cost, and the amount of first class information is above a data threshold value.

20 Claims, 11 Drawing Sheets

PROGRAM OPERATION SEQUENCE DETERMINATION FOR REDUCED POTENTIAL LEAKAGE OF PERSONALLY IDENTIFIABLE INFORMATION

BACKGROUND

Vehicle-mounted sensors are becoming much more common. The advent of autonomous driving has added not only traditional cameras to vehicles, but also an array of sensors, such as GPS and LiDAR. The combination of these sensors enables vehicles to obtain a detailed representation of the world around them. Although the sensor data composing this representation is mostly overwritten due to storage concerns, some of the information is stored for purposes of creating simulation environments, for training and prediction, such as ADAS, maps, using live-actionable or historic information. The usability of this information increases with the quality. In general, as the quality of information increases, required data transfer and storage capacity also increases.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
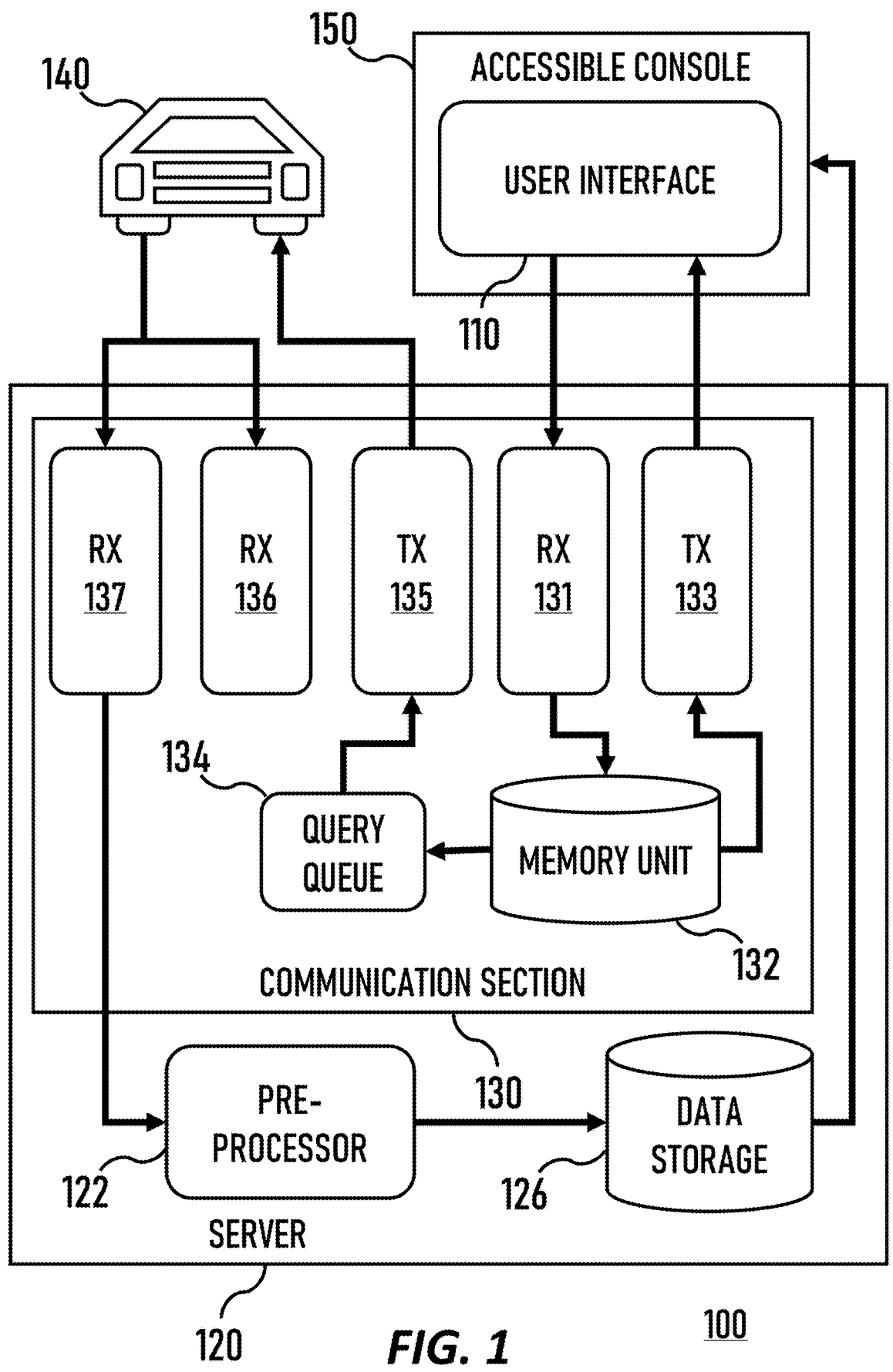
FIG. 1 is a schematic diagram of a system for mobile computing network queried content capture in accordance with at least some embodiments of the subject disclosure.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

As the quality of information increases, the likelihood of information sufficient for identifying a person increases, and the likelihood of transmitting irrelevant information increases. For example, full quality images of crowds can easily identify individuals, but even when facial information is removed/blurred, it may be possible to determine identity by a combination of height, clothing, location, time, etc. Depending on the query only certain information is useful, and filtering the other information reduces the likelihood of retaining Personally identifiable information (PII) or information that can recreate PII.

At least some embodiments of the subject disclosure described herein factor in the effect of filtering and compression on PII into the overall determination of computation and location among stages of a vehicle-sensor to cloud network, which balances the level of filtering and compression at each stage of the vehicle-sensor to cloud network.

In order to obtain useful information from a vehicle sensor through to the cloud, samples detected by sensors include both information of a first class, which is useful, and information of a second class, which is not usable. As the sample data passes through the stages, the second class information is reduced in accordance with program operation sequences determined by at least some embodiments. Sequences in accordance with at least some embodiments seek to minimize or remove entirely the second class information by the time the sample data is stored in the cloud stage. In at least some embodiments, resources are allocated for detecting, filtering, compressing, transmitting, etc., the information through the stages.

Different filters, compressors, and analyzers are determined to be used at different stages in sequences in accordance with at least some embodiments, where stages vary in computational complexity. For example, removing color information from an image is relatively simple compared to object detection in terms of computational complexity.

Computational costs and transmission costs also change by stage. For example, adding processing resources to the sensor is expensive, but transmission of data from the sensor to the next level is inexpensive. In contrast, adding processing resources to the cloud is inexpensive, but transmission of data from the vehicle storage to the cloud is expensive.

The potential for PII leakage also changes by stage. For example, filtering or compressing at the sensor is assigned a significantly low potential for PII leakage in at least some embodiments. In contrast, filtering or compressing at the cloud level is assigned a significantly increased potential for PII leakage in at least some embodiments. In at least some embodiments, the assigned potential for PII leakage further changes by level or type of compression or filtering. In at least some embodiments, the assigned potential for PII leakage for removing color information from an image maintains a relatively high compared to object detection to reduce the image to a number of encoded observation representations.

In at least some embodiments, the overall determination of computation and location among stages of a vehicle-sensor to cloud network involves assessing a set of computational resources and a set of program operations, where each operation has a flow requirement representing the amount of data that needs to be processed by the resource, and each resource has a capacity representing the amount of data that it is capable of processing. In at least some embodiments, each pair of a given resource and a given operation is associated with a cost for that pair. In at least some embodiments, the cost is represented in terms of PII leakage potential alone or in combination with traditional transmission and computation costs.

A user, such as a software developer, an insurance provider, a market researcher and a law enforcement officer, is able to use an on-demand data retrieval (ODDR) system to enter a data request into a user interface, such as a graphical user interface (GUI). The software developer is a software developer who develops applications, middleware or OS (operating systems) to be run on the vehicle, for example. Example applications include automated-driving system applications, such as an object recognition application, a road recognition application, a sensor fusion application, a localization application, a path planner application, a controller application, etc. The data request is analyzed and stored in a server and then transmitted to a vehicle by the server. On the server side, the data requests are stored in a storage unit and a request queue is generated based on the stored requests. The user is able to see or request updates on a status of the data request. For example, while the data request is still within the server prior to transmission to the vehicle, the status may be indicated as "pending." Once the server transmits the data request to the vehicle, the status may be updated to "submitted." This allows the user to see and track the status of data requests made to the vehicle. One of ordinary skill in the art would recognize that the description refers to a vehicle for the sake of clarity; however, the description is applicable to groups of vehicles in addition to a single vehicle.

The user interface for generating the data request includes forms related to vehicle identifying information, data types being requested, start time and end time. In some embodiments, the start time and the end time are absolute times, such as Unix time, that is an elapsed time since a Unix epoch time. In some embodiments, the start time and the end time are relative times to the time that the data request is received by the vehicle. In some embodiments, the start time and the end time are relative times to a trigger event. The trigger event is the occurrence within the vehicle or in the environment surrounding the vehicle about which the user is seeking data or receipt of a data request by the vehicle. For example, a trigger event resulting from an environment surrounding the vehicle includes sudden acceleration, sudden braking, capturing an image of a target of a data request, detecting of a target of a data request or other suitable occurrences. The user information for monitoring a status of data requests includes identifying information of the data request and a status of the data request, such as pending or submitted.

In some embodiments, once the data request is received by the vehicle, the data request is processed to make the data request agnostic as to the source of the data request. In some embodiments, a data request identification (ID) is assigned to the received data request by the vehicle, for example by a request abstractor in the vehicle. In some embodiments, the data request ID is assigned to the data request prior to transmission of the data request to the vehicle. In some embodiments, a data request is generated by an application running in the vehicle and the application assigns the data request ID. In other words, the data is processed in a consistent manner regardless of a program or system that transmits the data request to the vehicle. In some embodiments, a data request is generated by a software component stored within the vehicle, and the data is processed in consistent with a data request received from an external device. This helps to sharing the same data collection software components among trigger data collection, where an application generates a data collection request to the logger, and the ODDR-based external data collection request.

In some embodiments, once the data request is received by the vehicle, the data request is processed to make the data request agnostic to the sensors within the vehicle and the server. In some embodiments, the data request is generated by an application running in the vehicle. In some embodiments, an application programming interface (API) is usable to make the data request from the application agnostic to the sensors within the vehicle or information from the server. This helps to maximize the user's ability to collect data without programming a request for specific sensor models. The data request is then transferred to a data collector and the requested data is collected in response to occurrence of the trigger event. In the situation where the trigger event had already occurred, such as a traffic accident, the data request is fulfilled based on data stored within a storage device within the vehicle. A time frame, i.e., start and end times, of the collected data is determined based on the data request. The collected data is transferred back to the server.

The collected data is then stored in the server and a notification is sent to the user regarding completion of the data request. For example, the status of the data request is updated to "complete" on the user interface.

In some instances, a budget management system or a payment system is implemented on the server side or vehicle side, such that the user is charged a fee for a data request. The fee is payable either at the submission of the request or at completion of data collection. The fee is adjustable based on the type and amount of data requested. In some embodiments, when the total amount of fee that is charged to the user reaches a maximum threshold of user's budget, the data request from the user is rejected.

This ODDR system allows users to access information collected by vehicle in an on-demand style. That is, the data is not necessarily continuously collected, but could be collected to satisfy specific desires of a user. In some embodiments, the ODDR system helps users, such as software developers, collecting data to update the design, implementation and parameter tuning of their software in an exploratory way based on collected data so that the users are able to continuously improve the software by delivering updates from the server to the vehicle via network, for example, as an Over-the-Air (OTA) update. In some embodiments, the ODDR system helps machine learning developers who develops machine learning model for the applications collecting data to train the model with the data which was not available when the model was initially developed so that the machine learning developers are able to update the models to fix weakness and issues of the model continuously. In some instances, an insurance provider would be able collect data related to a traffic accident. In some instances, law enforcement would be able to collect information related to a crime or a traffic accident.

FIG. 1 is a schematic diagram of a request retrieval system 100 in accordance with some embodiments. The request retrieval system 100 includes a user interface (UI) 110. The UI 110 is configured to receive a user request for data from a vehicle 140. The request retrieval system 100 further includes a server 120 configured to receive the user request from the UI 110; transmit the user request to the vehicle 140; receive data from the vehicle 140; and provide the data to the user via an accessible console 150. The server 120 includes a communication section 130 for communicating with the UI 110 and the vehicle 140. The request retrieval system 100 further includes an accessible console 150 configured to communicate data collected from the vehicle 140 to the user.

The UI 110 is configured to receive input instructions from the user. In some embodiments, the user includes a software developer. In some embodiments, the user includes a machine learning model developer. In some embodiments, the user includes an insurance provider. In some embodiments, the user includes law enforcement personnel. In some embodiments, the user includes a market research company. The UI 110 provides options for the user to select what type of vehicle and what type of data is being requested. In some embodiments, the UI 110 is capable of generating the data request using forms related to vehicle identifying information, data types being requested, start time and end time. In some embodiments, the start time and the end time are absolute times, such as Unix time, that is an elapsed time since a Unix epoch time. In some embodiments, the start time and the end time are relative times to the time that the data request is received by the vehicle. In some embodiments, the start time and the end time are relative times to a trigger event. In some embodiments, the UI 110 also provides the user with options for selecting a trigger event and a data collection duration relative to the trigger event. In some embodiments, the UI 110 includes information related to a type of vehicle from which data is requested. In some embodiments, the UI 110 includes vehicle ID which is able to uniquely identify a vehicle as a target of the request. For example, the vehicle ID includes a universally unique identifier (UUID) format. In some embodiments, the UI 110 includes data type that is able to identify the source of the data that user wants to collect. For example, the data type includes sensor ID of sensor that sensor data is collected from, application ID of application that application log is collected from. In some embodiment, the format of the sensor ID and application ID includes a universally unique identifier (UUID) format. In some embodiments, the UI 110 includes drop down menus. In some embodiments, the UI 110 includes editable fields for receiving information related to a data request. In some embodiments, the UI 110 provides information regarding what data option types are available to the user. In some embodiments, the data option types available depend on the user. For example, law enforcement is able to select more data options than an insurance provider in some embodiments.

In some embodiments, the UI 110 includes a graphical user interface (GUI). In some embodiments, the UI 110 includes a mobile terminal, such as a mobile telephone, connectable to the server 120. In some embodiments, the UI 110 includes a web interface such as RESTful API. In some embodiments, the UI 110 includes a computer connectable to the server 120. In some embodiments, the UI 110 is capable of wireless connection to the server 120. In some embodiments, the UI is connectable to the server 120 by a wired connection. The UI 110 is also able to provide the user with updates regarding a status of a data request. In some embodiments, the UI 110 provides status updates regarding a data request in response to an additional query by the user. In some embodiments, the UI 110 provides status updates regarding a data request upon receipt of updated information from the server 120 automatically without user interaction. In some embodiments, the status update causes the UI 110 to trigger an alert for the user. In some embodiments, the alert includes an audio or visual alert.

In some embodiments, the UI 110 includes a means for accepting payment of a fee from the user. In some embodiments, the UI 110 includes data entry fields to permit the user to enter payment card information. In some embodiments, the UI 110 includes a reader for detecting payment card information, such as a magnetic stripe reader, a bar code reader, a chip reader, or another suitable reader.

The server 120 includes a communication section 130 configured to communicate with the UI 110 and the vehicle 140. The communication section 130 includes a receiver 131 configured to receive data requests from the UI 110. In some embodiments, the receiver 131 includes a wireless receiver. In some embodiments, the receiver is configured to receive the data requests via a wired connection. In some embodiments, the receiver 131 is further configured to perform initial processing on the received data request. In some embodiments, the received data request includes priority level information. In some embodiments, the receiver 131 is configured to assign a priority level to the data request based on an identity of the user that submitted the data request or a fee paid by the user that submitted the data request. In some embodiments, the receiver 131 is configured to assign a request identification (ID) number to each received data request. In some embodiments, the server 120 is configured to limit access to certain sensors within the vehicle 140 based on an identity the user. For example, a third-party user will not be able to access sensor related to safety functions of the vehicle 140 in some embodiments.

The communication section 130 further includes a memory unit 132 configured to store data requests received by the receiver 131. In some embodiments, the memory unit 132 includes a random access memory, a solid state memory, or another type of memory. In some embodiments, the memory unit 132 is configured to store the data requests along with a status of the data request. In some embodiments, the status of the data request includes pending (prior to transmission of the data request to the vehicle 140); submitted (following transmission of the data request to the vehicle 140); and completed (following receipt of the requested data from the vehicle 140). In some embodiments, the memory unit 132 is accessible by the user. In some embodiments, updates to information in the memory unit 132 trigger notifications of a user associated with the information updated in the memory unit 132. In some embodiments, the memory unit 132 stores data requests in conjunction with time stamp data indicating a time at which the data request was received. In some embodiments, the memory unit 132 stores data requests in association with a priority level. In some embodiments, the priority level is determined based on an identity of the user. For example, in some embodiments, law enforcement has higher priority than an insurance provider, which has higher priority than a normal user, such as a software developer. In some embodiments, the priority level is determined based on a fee paid by the user. For example, in some embodiments, a user is able to pay a fee in order to increase a priority level of their request in order to obtain the requested data sooner. In some embodiments, the priority level of a data request is increased as an amount of time between initial storage of the data request and transmission of the data request to the vehicle increases.

The communication section 130 further includes a transmitter 133. The transmitter 133 is configured to transmit a status of data requests to the UI 110. In some embodiments, the status of the data requests is wirelessly transmitted to the UI 110. In some embodiments, the status of the data requests is transmitted to the UI 110 via a wired connection. In some embodiments, the transmitter 133 is configured to provide an update on a data request automatically in response to an update in the memory unit 132. In some embodiments, the transmitter 133 is configured to provide an update on a data request in response to a received update request from the user. In some embodiments, the transmitter 133 is configured to automatically transmit a request ID upon initially saving the data request in the memory unit 132. In some embodiments, the status of the data request includes a priority level of the data request. In some embodiments, the status of the data request includes an estimated time until the data request is transmitted to the vehicle 140.

The communication section 130 further includes a query queue 134 configured to store data requests in priority order for transmission to the vehicle 140. In some embodiments, the query queue 134 is integrated into the memory unit 132. In some embodiments, the query queue 134 is separate from the memory unit 132. In some embodiments, the query queue 134 is configured to retrieve data requests from the memory unit 132 based on priority level and time stamp information. In some embodiments, the query queue 134 is configured to order data requests based on priority level; and by time since initial saving in the memory unit 132 in response to data requests having a same priority level.

The communication section 130 further includes a transmitter 135 configured to transmit data requests to the vehicle 140 from the query queue 134. The transmitter 135 is configured to transmit the data requests to the vehicle 140 based on an order of the data requests in the query queue 134. In some embodiments, the data requests are transmitted to the vehicle 140 wirelessly. In some embodiments, the data requests are transmitted to the vehicle 140 by a wired connection. The data requests transmitted to the vehicle 140 include trigger event information, data duration information related to how long before and after the trigger event the data should be collected, and sensor information indicating a type of sensor of the vehicle 140 should collect the data. In some embodiments, the data requests transmitted to the vehicle 140 include priority level information. In some embodiments, the transmitter 135 is configured to transmit data requests to the vehicle 140 when the vehicle 140 sends a request to server 120 to transmit the data requests to the vehicle 140. In some embodiments, the transmitter 135 is configured to transmit data requests to the vehicle 140 any time the communication section 130 has sufficient connectivity to the vehicle 140 to transmit the data request unless the communication section 130 has received information indicating that the vehicle 140 is unable to accept a new data request. In some embodiments, the transmitter 135 is configured to transmit the data requests to the vehicle 140 periodically so long as the vehicle 140 is able to receive new data requests and the transmitter 135 has sufficient connectivity to the vehicle 140. In some embodiments, the transmitter 135 is configured to transmit the data requests to the vehicle 140 in batches, such as in groups of 5 data requests, 20 data requests or some other number of data requests. In some embodiments, the transmitter 135 is configured to request confirmation of receipt of the data request from the vehicle 140. In response to failing to receive confirmation of receipt from the vehicle for a predetermined time period, the transmitter 135 is configured to re-transmit the data request. In some embodiments, the status of the data request stored in the memory unit 132 is updated to indicate submission to the vehicle 140 in response to the communication section 130 receiving confirmation of receipt of the data request from the vehicle 140.

The communication section 130 further includes a receiver 136 configured to receive notification of the occurrence of trigger events from the vehicle 140. In some embodiments, the occurrence of a trigger event is receipt of a data request. In some embodiments, the receiver 136 is configured to receive the notification of the trigger events wirelessly. In some embodiments, the receiver 136 is configured to receive the notification of the trigger events via a wired connection. In some embodiments, the receiver 136 is configured to send a signal to the memory unit 132 to update a status of a data request related to the notified trigger event.

The communication section 130 further includes a receiver 137 configured to receive data from the vehicle 140 responsive to the data requests transmitted by the transmitter 135. In some embodiments, the data is split by the vehicle 140 into data packets that is the unit of transmission from the vehicle 140 to the server 120, and the receiver 137 receives the data packet from the vehicle 140. In some embodiments, the receiver 137 is configured to receive the data wirelessly. In some embodiments, the receiver 137 is configured to receive the data via a wired connection. In some embodiments, the receiver 137 is configured to send a signal to the memory unit 132 to update a status of a data request related to the receipt of requested data. In some embodiments, the data responsive a single data request is received in a single packet from the vehicle 140. In some embodiments, the data responsive to a single data request is received in multiple packets from the vehicle 140. The receiver 137 transfers the received data to a pre-processor 122.

The server 120 further includes the pre-processor 122 configured to receive data from the receiver 137 and perform pre-processing on the data to generate collected data. In some embodiments, the pre-processing includes reforming of data from multiple packets to compile data responsive to a data request. In some embodiments, the pre-processing includes de-serializing of data to compile structured data from a byte array that is received. In some embodiments, the pre-processing includes de-compressing of data if the data is compressed by the vehicle 140 before sending. In some embodiments, the pre-processing includes error correction by Error Correction Code (ECC) such as Reed-Solomon (RS) Code, Bose-Chaudhuri-Hocquenghem (BCH) code, Low-density parity-check (LDPC) code and the like. In some embodiments, the pre-processing includes smoothing of data by removing outlier values to reduce a risk of report incorrect data to the user. In some embodiments, the pre-processing includes associating data request ID information, priority level information or other suitable information with the received data from the receiver 137. In some embodiments, the data is pre-processed so that the information is provided to the user in a format that is easy to understand and does not rely on specialized knowledge or equipment to discern the information.

The server 120 further includes a data storage 126 configured to store the collected data generated by the data pre-processor 122. In some embodiments, the data storage 126 is integrated with the memory unit 132. In some embodiments, the data storage 126 is separate from the memory unit 132. In some embodiments, the data storage 126 includes a solid state drive (SSE), a random access memory or another suitable memory. In some embodiments, the data storage 126 is accessible by the user, e.g., using the UI 110 or an accessible console 150. In some embodiments, the data storage 126 is configured to notify the user in response to data related to a data request is available. In some embodiments, the notification includes an alert to the user. In some embodiments, the alert includes an audio or visual alert. In some embodiments, the data storage 126 is configured to cause the UI 110 or the accessible console 150 to automatically display the notification of an availability of the collected data. In some embodiments, the data storage 126 is accessible by a user using the accessible console 150 without the user submitting a data request. In some embodiments, the data within the data storage 126 are searchable by the user via the accessible console 150. In some embodiments, the collected data is visualized in the console 150.

The request retrieval system 100 further includes a vehicle 140. The vehicle 140 includes sensors to detect both an internal status of the vehicle 140 as well as an external environment surrounding the vehicle 140. In some embodiments, the sensors include a camera, a light distance and ranging (LiDAR) sensor, a radio distance and ranging (RADAR) sensor, a sound navigation and ranging (SONAR) sensor, an accelerometer, a steering wheel position, a speedometer, or another suitable sensor. The vehicle 140 is capable of receiving data requests, either wirelessly or via a wired connection.

In some embodiments, in response to receiving the data request, the vehicle 140 is configured to assign a data request ID to the received data request and the data request is processed to be agnostic to an originating system or program of the data request. In another embodiments, the communication section 130 instead of the vehicle 140 assigns the data request ID, and the data request ID is included in the data request that is sent from the communication section 130 to the vehicle 140. Making the data request agnostic to the originating system or program of the data request helps with expanding an ability of the vehicle 140 to receive and process a wide range of data requests from different users and systems. The vehicle 140 includes a processor for processing the data requests and determining what type of information from which sensors available in the vehicle 140 are capable of satisfying the data request. In at least some embodiments, the vehicle 140 includes a mobile computing network, which is a network of processors, controllers, or a combination thereof, such as a Controller Area Network (CAN). In at least some embodiments, each processor is an Electronic Control Unit (ECU). The vehicle 140 further includes a memory for storing data from the sensors. In some embodiments, the processor accesses the memory to determine whether any stored data is capable of satisfying the data request. The vehicle 140 is further capable of transmitting the data deemed to satisfy the data request to the server 120 either wirelessly or via a wired connection. In some embodiments, the processor is configured to attempt to satisfy received data requests in a priority order based on a received priority level of the data request. In some embodiments, the vehicle 140 is configured to transmit data to the server preferentially based on the received priority level of the data request.

In some embodiments, the memory and the processor of the vehicle 140 are configured to store and execute software applications in an electronic control unit (ECU) within the vehicle 140. In some embodiments, a data request is generated by the software application stored in the ECU. In some embodiments, the data request is generated in response to a trigger event, such as sudden acceleration, sudden braking, capturing sensor data including specific objects or specific scenes that are predefined in the software application, "crashing" of the software application, a detected abnormality in the software application, or another suitable detected occurrence. In some embodiments, the vehicle 140 is configured to generate a notification to a maintainer, e.g., the user, of the software application in response to detecting a trigger event associated with the software application. In some embodiments, the notification is transmitted, either wirelessly or through a wired connection, directly to the user, e.g., through the UI 110. In some embodiments, the notification is transmitted, either wirelessly or through a wired connection, to the user through the server 120. In some embodiments, the notification includes an audio or visual notification. In some embodiments, the notification is configured to cause the UI 110 to automatically display the notification without user interaction.

The request retrieval system 100 further includes an accessible console 150. The accessible console 150 permits the user to access the collected data stored in the data storage 126. In some embodiments, the accessible console 150 is integrated with the UI 110. In some embodiments, the accessible console 150 is separate from the UI 110. In some embodiments, the accessible console 150 includes another server separate from the server 120. In some embodiments, the accessible console 150 automatically receives collected data related to a data request from the user upon receipt of the collected data by the data storage 126. In some embodiments, the accessible console 150 permits the user to search the data storage 126 to determine whether any of the collected data stored in the data storage 126 are useful to the user without the user submitting a data request.

Using the request retrieval system 100 permits users to obtain information from one or more vehicles 140 in a format that is easy to understand without relying on specialized equipment to request or read the received data. The ability to prioritize data requests in the request retrieval system 100 help to ensure that law enforcement or other user is able to obtain data, while also permitting users to pay a fee to obtain data faster. This flexibility helps to improve the usefulness of the request retrieval system 100 for a wide range of users.

Figure 2:
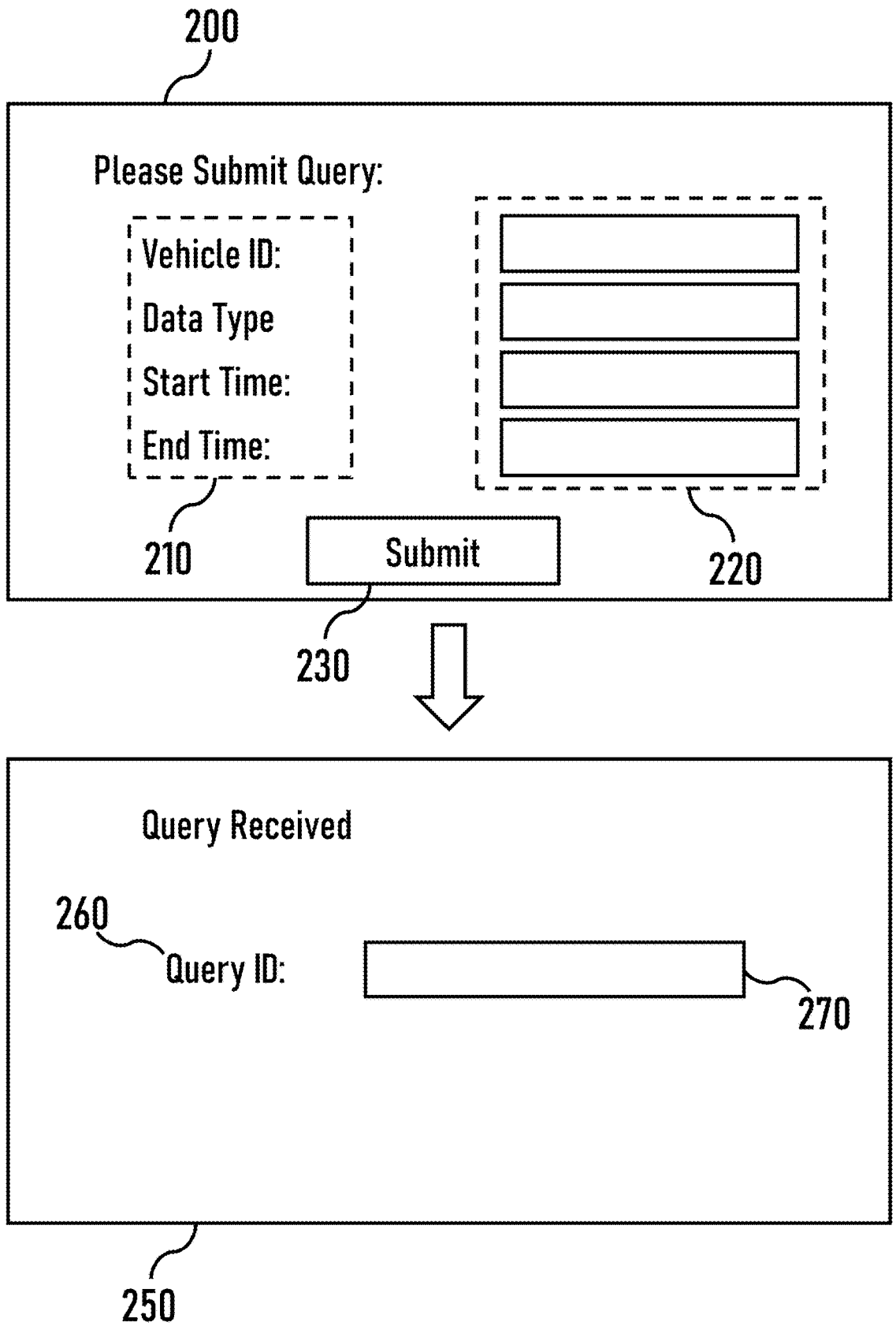
FIG. 2 is views of a graphical user interface (GUI) for mobile computing network content query in accordance with at least some embodiments of the subject disclosure.

FIG. 2 is views of a graphical user interface (GUI) 200 and 250 for request retrieval system in accordance with some embodiments. In some embodiments, the GUI 200 is usable as UI 110 in request retrieval system 100 (FIG. 1). In some embodiments, the GUI 200 is usable to generate a data request for receipt by the receiver 131 (FIG. 1). The GUI 200 includes a plurality of information types 210 which identify a type of information that the GUI 200 is able to accept from the user. The GUI 200 further includes a plurality of fields 220 configured to receive information related to a corresponding information type 210 of the GUI 200. The GUI 200 further includes a submit button 230 configured to submit a data request to a server, e.g., server 120 (FIG. 1), based on the information in the fields 220. One of ordinary skill in the art would recognize that the names and number of the plurality of information types 210 is merely exemplary and that different numbers and types of information are also within the scope of this disclosure.

In some embodiments, the fields 220 includes fields for users to enter the vehicle ID, the data type, the start time and the end time. In some embodiments, the field 220 further includes a field for users to enter a priority level of the data request. In some embodiments, the GUI 200 further includes information related to how a user is able to increase a priority level of a data request, such as indicating a fee associated with each available priority level. In some embodiments, the GUI 200 includes fields 220 for allowing a user to enter log in information to establish an identity of the user. In some embodiments, the GUI 200 is configured to display a priority level of the user following receiving log in information. In some embodiments, the GUI 200 further includes fields 220 for receiving payment information related to fees for establishing a priority level of a data request.

The GUI 250 is configured to be displayed to the user after the user has selected the submit button 230 on GUI 200. In some embodiments, the GUI 250 is usable as the GUI 110 in the ODDR system 100 (FIG. 1). The GUI 250 includes information indicating that the data request has been received. The GUI 250 includes a query ID label 260 and a query ID field 270. Information for populating the query ID field 270 is received from a server, e.g., server 120 (FIG. 1), following the server receiving and storing the data request. In some embodiments, the GUI 250 includes information of the vehicle ID. In some embodiments, the GUI 250 includes information related to a priority level of the data request. In some embodiments, the GUI 250 includes information regarding a status of the data request, such as pending, submitted, completed, etc. In some embodiments, the GUI 250 includes information related to an estimated time until the data request is submitted to a vehicle, e.g., vehicle 140 (FIG. 1). In at least some embodiments, the GUI 250 includes information related to an estimated time until the requested data is received. In at least some embodiments, the GUI 250 includes information related to an estimated energy expenditure to receive the requested data. In some embodiments, the GUI 250 is displayed automatically in response to receipt of query ID information from the server. In some embodiments, the GUI 250 is displayed in response to a user submitting a request for an update on an uploaded data request.

Figure 3:
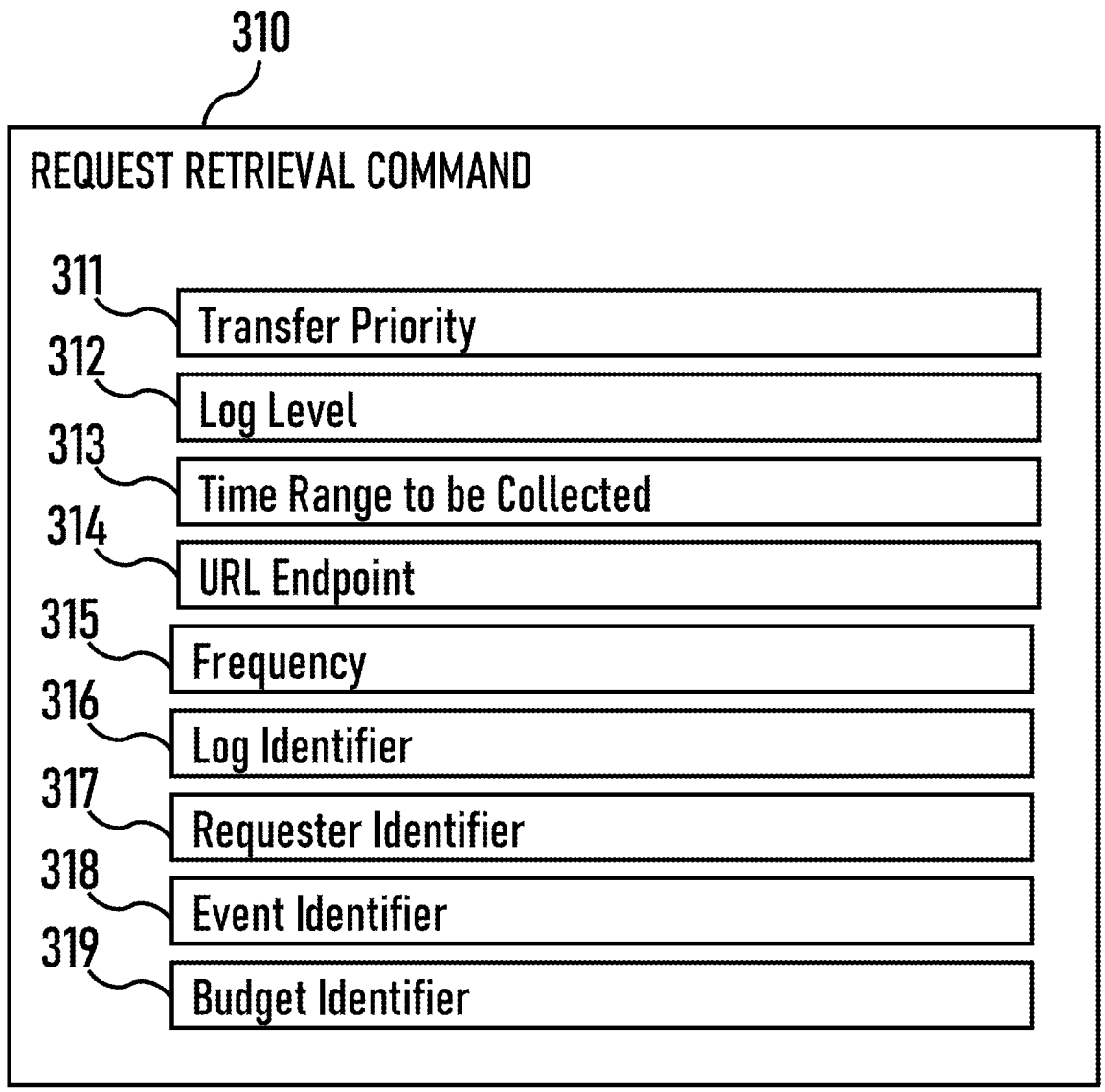
FIG. 3 is a diagram of a data structure of a content retrieval task in accordance with at least some embodiments of the subject disclosure.

FIG. 3 is a diagram of a data structure 300 of a request retrieval command 310 in accordance with some embodiments. In some embodiments, the request retrieval command 310 is transmitted from the server 120 to the vehicle 140 (FIG. 1). The request retrieval command 310 includes information related to a type of data sought by a data request to a vehicle, e.g., vehicle 140 (FIG. 1).

The request retrieval command 310 includes a transfer priority parameter 311 that indicates a priority level of the data request. The request retrieval command 310 further includes a log level parameter 312 that indicates what type of data, if any, should be retrieved from other applications on the vehicle. For example, in some embodiments, the request retrieval command 310 retrieves data from an object recognition application. The log level parameter 312 determines what type of data to retrieve from the other application, such as error level or critical level. In some embodiments, the log level parameter 312 is omitted from the request retrieval command 310 or the log level parameter 312 is left in a null state. The request retrieval command 310 further includes a time range to be collected parameter 313 that indicates a time period before and/or after a trigger event to collect data. The time range is corresponding to the start time and the end time that was entered in GUI 200 (FIG. 2) by the users. The request retrieval command 310 further includes a uniform resource locator (URL) endpoint parameter 314 that indicates a destination for the data collected in response to the data request. The request retrieval command 310 further includes a frequency parameter 315 that indicates how often, if ever, the data should be sampled from the rime range 313. For example, when the event time is t=100 sec, the time range comprises start time=−1 sec and end time=2 sec and the frequency is 10 Hz (100 msec cycle), then the data at t=99.0 sec, 99.1 sec, 99.2 sec, . . . , 101.9 sec, 102.0 sec is collected by the request retrieval command. The request retrieval command 310 further includes a log ID parameter 316 that indicates types of sensors and/or applications usable to collect the data requested by the data request. In some embodiments, unique IDs (such as Universally unique identifier (UUID)) are pre-assigned to all the sensors and applications, and the unique IDs which the user want to collect data from is specified in the log ID parameter 316. The request retrieval command 310 further includes a requester ID parameter 317 that indicates an identity of the user that made the data request. The request retrieval command 310 further includes an event ID parameter 318 that indicates a trigger event associated with the data request. The request retrieval command 310 further includes a budget ID parameter 319 that indicates how much of the resources of the vehicle, e.g., vehicle 140 (FIG. 1), should be allocated to satisfying the data request. One of ordinary skill in the art would understand that additional parameters are possible in the request retrieval command 310. For example, in some embodiments, the request retrieval command 310 includes vehicle location parameter that indicates a geographic area where the trigger event is capable of occurring. One of ordinary skill in the art would also understand that the request retrieval command 310 does not always include all of the parameters in FIG. 3. For example, in some embodiments, the budget ID parameter 319 is omitted.

Figure 4:
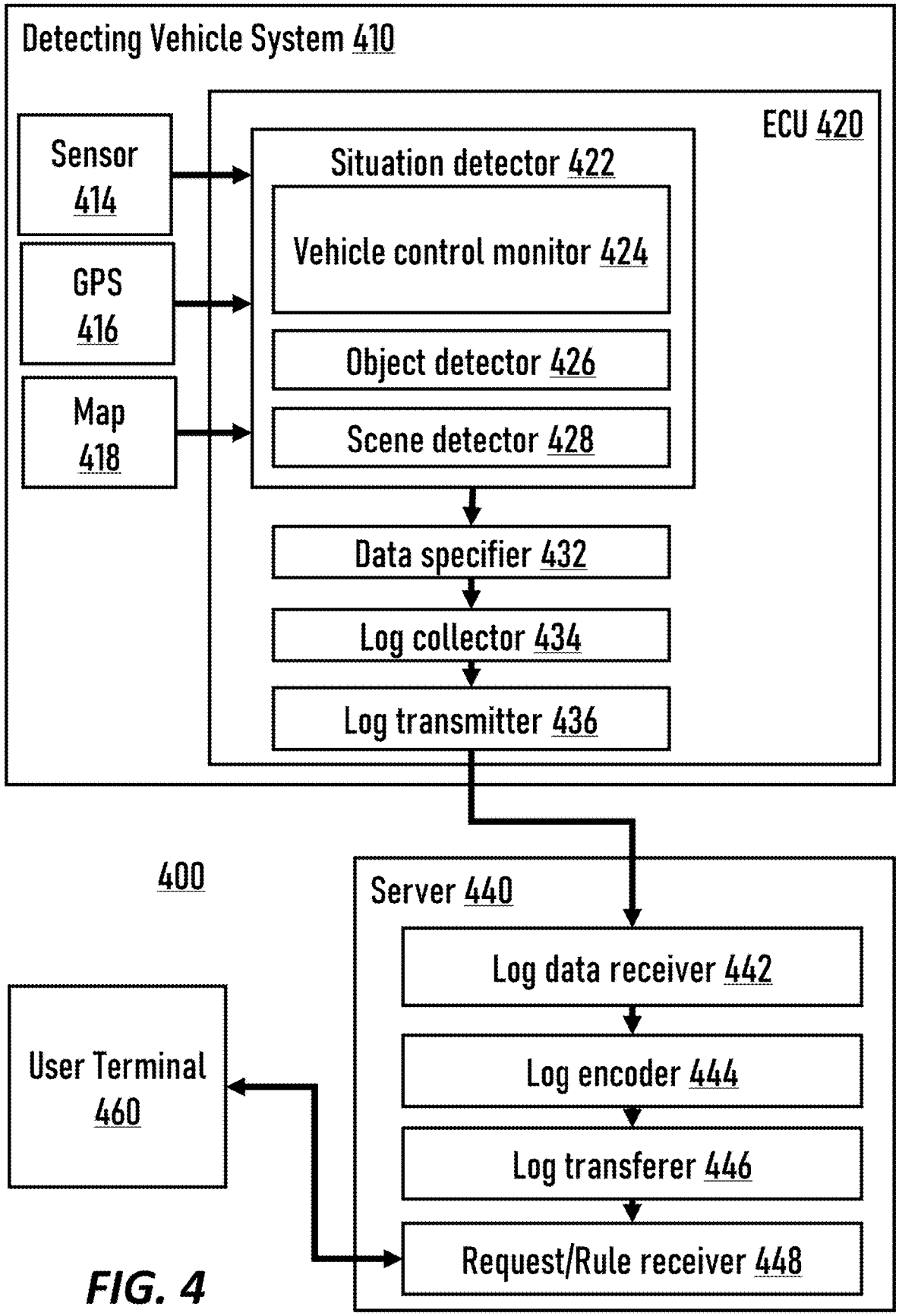
FIG. 4 is a schematic diagram of a queried content retrieval system in accordance with at least some embodiments of the subject disclosure.

FIG. 4 is a block diagram of a request retrieval system 400, in accordance with some embodiments. In some embodiments, the request retrieval system 400 is part of the request retrieval system 100 (FIG. 1). In some embodiments, the request retrieval system 400 is usable in conjunction with the request retrieval system 100 (FIG. 1). In some embodiments, the request retrieval system 400 is separate from the request retrieval system 100 (FIG. 1).

The request retrieval system 400 includes a detecting vehicle system 410 configured to capture information about a vehicle or surroundings of the vehicle. The detecting vehicle system 110 captures information about the vehicle and the surroundings and transmits the information to a server. The request retrieval system 400 further includes a server 440 configured to receive the information, encode the information, and disseminate the information to a user terminal 460.

The detecting vehicle system 410 includes an electronic control unit (ECU) 420 configured to receive data from a sensor 414, a global positioning system (GPS) 416 and a map 418. The ECU 420 includes a situation detector 422, a data specifier 432, a log collector 434 and a log transmitter 436. The situation detector 422 includes a vehicle control monitor 424, an object detector 426, and a scene detector 428.

In some embodiments, the ECU 420 further includes a localization unit configured to receive data from the GPS 416 and the map 418 and determine a position of the vehicle and a pose and state of the vehicle relative to detected and/or known objects and/or road position. A pose is an orientation of the vehicle relative to a reference point, such as a roadway. In some embodiments, the position of the vehicle also refers to a position vector of the vehicle. The pose and state of the vehicle refers to a speed and a heading of the vehicle. In some embodiments, the pose and state of the vehicle also refers to a velocity vector, an acceleration vector and jerk vector of the vehicle. In some embodiments, the position vector, the velocity vector, the acceleration vector, and the jerk vector include angle vector. In some embodiments, the state of the vehicle also refers to whether an engine or motor of the vehicle is running.

The sensor 414 is configured to capture information, such as images, of an environment surrounding the vehicle. In some embodiments, the sensor 414 includes a visible light camera, an IR camera. In some embodiments, the sensor 414 is replaced with or is further accompanied by a light detection and ranging (LiDAR) sensor, a radio detection and ranging (RADAR) sensor, a sound navigation and ranging (SONAR) sensor or another suitable sensor. In some embodiments, the sensor 414 includes additional cameras located at other locations on the vehicle. For example, in some embodiments, additional cameras are located on sides of the vehicle in order to detect a larger portion of the environment to the left and right of the viewing vehicle. Since vehicle occupants are able to look out of side windows of the vehicle, using additional cameras to detect a larger portion of the environment surrounding the vehicle helps to increase precision of detecting objects or scenes surrounding the vehicle. For example, in some embodiments, additional cameras are located on a back side of the vehicle in order to detect a larger portion of the environment to a rear of the vehicle. This information helps to capture information about objects. In some embodiments, the data from the sensor 414 includes a timestamp or other metadata in order to help synchronize the data from the sensor 414 with the data from other components.

The GPS 416 is configured to determine a location of the vehicle. Knowing the location of the viewing vehicle helps to relate an object or scene with determined locations on the map 418.

The map 418 includes information related to the roadway and known objects along the roadway. In some embodiments, the map 418 is usable in conjunction with the GPS 416 to determine a location and a heading of the vehicle. In some embodiments, the map 418 is received from an external device, such as the server 440. In some embodiments, the map 418 is periodically updated based on information from the sensor 414 and/or the GPS 416. In some embodiments, the map 418 is periodically updated based on information received from the external device. In some embodiments, the map 418 is generated from sensor data by simultaneous localization and mapping (SLAM) algorithm. Including the map 418 helps to determine whether an object is a known object. Including the map 118 having known objects helps to increase precision of new object detection.

The situation detector 422 is configured to generate information related to performance of the vehicle and of systems within the vehicle. The situation detector 422 is able to collect information from components within the vehicle, such as the sensor 414, braking systems, acceleration system, and other suitable components. Utilizing this information, the situation detector 422 is able to determine performance of the vehicle. In some embodiments, the situation detector 422 is further configured to monitor performance of software and networking operations within the vehicle. For example, in some embodiments, the situation detector 422 is configured to receive information related to "crashing" of software or applications within the vehicle. In some embodiments, the situation detector 422 is configured to collect information regarding a storage capacity of a memory device within the vehicle. In some embodiments, the situation detector 422 is configured to receive information related to a processing capability of a processor within the vehicle.

The vehicle control monitor 424 is configured to receive sensor data and control logs related to current operation of the vehicle. In some embodiments, the sensor data includes information related to vehicle speed, acceleration, jerk, braking, steering, pitching, rolling, yawing, blinking hazard lamp, horn beeping, or other suitable information. The vehicle control monitor 424 is configured to determine whether any of the received sensor data indicates the satisfaction of a criteria for fulfilling a request, e.g., a trigger event was detected.

The object detector 426 is configured to receive sensor data from the sensor 414 to determine whether any abnormal objects are located in the roadway. In some embodiments, the object detector 426 is further configured to determine whether any objects are present along or adjacent to the roadway. In some embodiments, the sensor data from the sensor 414 includes an image and the object detector 426 is configured to perform image recognition on the received image, e.g., using a trained neural network, to identify abnormal objects. In some embodiments, the object detector 426 is configured to compare any identified objects with information from the GPS 416 and the map 418 to help determine a type of an identified object. In some embodiments, the object detector 426 is configured to identify objects, e.g., a tire, a car part, etc., an animal, a pothole, a traffic regulation board, an emergency vehicle, a vehicle with hazard lights active, or other suitable objects as objects.

The scene detector 428 is configured to receive the sensor data from the sensor 414 to determine whether any scenes are located in an environment surrounding the vehicle that satisfy a condition for fulfilling a request. In some embodiments, the scene detector 428 is configured to determine that a vehicle accident has occurred in response to detecting that two or more vehicles are in contact with one another or that a vehicle is surrounded by multiple fallen objects. In some embodiments, the scene detector 428 is configured to determine that construction is occurring based on detecting multiple construction vehicles in close proximity. In some embodiments, the scene detector 428 is configured to determine that a vehicle is parked on a shoulder of the roadway based on determining that a vehicle is located adjacent to the roadway and is not moving or is moving significantly slower than other vehicles. In some embodiments, the scene detector 428 is configured to use image recognition, such as through a trained neural network, to determine contents of a scene surrounding the vehicle.

In some embodiments, each of the object detector 426 and the scene detector 428 are active during an entire period of operation of the vehicle, e.g., when an engine or motor of the vehicle is running. In some embodiments, at least one of the object detector 426 or the scene detector 428 is activated in response to the vehicle control monitor 424 determining that a specific behavior, e.g., trigger event, was detected.

The data specifier 432 is configured to receive a determination that a fulfillment of a request was performed or that a trigger event was detected. The data specifier 432 is configured to analyze the received information to determine what sensor data from the sensor 414 should be collected based on the received data. For example, in some embodiments where an abnormal steering behavior by the driver is detected, the data specifier 432 is configured to determine that image data from a front camera of the sensor 414 should be captured. Further, the data specifier 432 is configured to determine a time period over which the data from the determine sensor should be collected based on a time of the detected situation. In some embodiments, the data specifier 432 is configured to determine the sensor 414 from which to collect data based on instructions in a received request from user.

In some embodiments, the data specifier 432 is configured to determine a region of the received sensor data that is relevant to the detected situation. In some embodiments, the region of the received sensor data is identified based on object recognition performed on the sensor data, e.g., by the object detector 426 or the scene detector 428. In some embodiments, the data specifier 432 is configured to crop a received image from the sensor data or remove extraneous data from the sensor data if the sensor data is not an image to reduce an amount of information in a log of the abnormal situation. In some embodiments, the data specifier 432 is configured to remove personal information such as license plate, human faces, etc. from the sensor data.

The log collector 434 is configured to receive data from the data specifier 432. In some embodiments, the log collector 434 is configured to receive data directly from the sensor 414, the GPS 416, or the situation detector 422 based on information provided by the data specifier 432. The log collector 434 is also configured to determine what information is useful for identifying the type and location of the object, such as location information from the GPS 416 or the map 418, image information from the sensor 414, cropped or reduced information from the data specifier 432, timestamp information related to a time the object or scene was detected, or other suitable information.

The log collector 434 generates log data based on the received and correlated data, such as the cropped image and location data. The log collector 434 also associates timestamp information with the log data in order to assist with synchronization of the collected data and for queue priority within the server 440. In some embodiments, the log collector 434 generates the log data to further include world coordinates associated with the cropped image. In some embodiments, the log collector 434 generates the log data to further include a map location associated with the cropped image. In some embodiments, the log collector 434 includes additional information to assist in increasing accuracy of determining the object or scene.

While the above description relates to generating log data based on an image from the sensor 414, one of ordinary skill in the art would understand that the log collector 434 is not limited solely to generating log data based on images. In some embodiments, the log collector 434 is configured to generate log data based on information from other sensors attached to the vehicle, such as RADAR, LiDAR, or other suitable sensors. In some embodiments where the occupant is wearing smart glasses, the log collector 434 is further configured to generate the log data based on information received from the smart glasses.

The log transmitter 436 is configured to receive log data from the log collector 434 and transmit the log data to the server 440. In some embodiments, the log transmitter 436 is configured to transmit the log data wirelessly. In some embodiments, the log transmitter 436 is configured to transmit the log data via a wired connection. In some embodiments, the log transmitter 436 is configured to transmit the log data to the user terminal 460 directly. In some embodiments, the log transmitter 436 is configured to transmit the log data to a mobile device accessible by the user, which in turn is configured to transmit the log data to the server 440. In some embodiments, the log transmitter 436 is configured to transmit the log data to the mobile device using Bluetooth® or another suitable wireless technology. In some embodiments, the ECU 420 is configured to determine whether the data transfer rate from the mobile device to the server 440 is higher than a transfer rate from the log transmitter 436 to the server 440. In response to a determination that the data transfer rate from the mobile device to the sever 440 is higher, the log transmitter 436 is configured to transmit the log data to the mobile device to be transmitted to the server 440. In response to a determination that the data transfer rate from the mobile device to the server 440 is not higher, the log transmitter 436 is configured to transmit the log data to the server 440 from the vehicle system 410 directly without transferring the log data to the mobile device.

In some embodiments, the detecting vehicle system 410 further includes a memory configured to store sensor data from sensors attached to the vehicle. In some embodiments, the memory is further configured to store information associated with previously detected objects or scenes. In some embodiments, in response to detecting an object or scene that matches a previous object or scene, the data specifier 434 is configured to provide results based on the matching object or scene. In some embodiments, the detecting vehicle system 410 is further configured to determine whether the detecting vehicle has received from the server 440 information related to an object or scene that matches the determined object or scene from the situation detector 422. In some embodiments, in response to determining that the detecting vehicle has already received information related to the determined object or scene, the detecting vehicle system 410 is configured to prevent transmission of the log data to the server 440. Avoiding transmission of redundant information to the server 440 helps to reduce data transmitted to the server 440 and helps to minimize power consumption by the detecting vehicle system 410. In some embodiment, the storing of the previous requests is called caching. One of ordinary skill in the art would understand caching as using hardware or software to store data so that future requests for that data are able to be served faster.

The server 440 includes a log data receiver 442 configured to receive the log data from the log transmitter 436. In some embodiments, the log data receiver 442 is configured to receive the log data from the mobile device. The server 440 further includes a log encoder 444 configured to encode the log data. The server 440 further includes a log transferrer 446 configured to transmit the encoded log data to the user terminal 160. The server 440 further includes a request/rule receiver 448 configured to receive a request or a rule from the user terminal 460.

The log data receiver 442 is configured to receive the log data from the log transmitter 436. In some embodiments, the log data receiver 442 is configured to receive the log data from the mobile device. In some embodiments, the log data receiver 442 is configured to receive the log data wirelessly. In some embodiments, the log data receiver 442 is configured to receive the log data via a wired connection. In some embodiments, the log data receiver 442 is configured to attach a timestamp for a time that the log data was received to the log data.

The log encoder 444 is configured to encode the received log data according to a predetermined encoding protocol. Encoding the log data according to a predetermined encoding protocol helps to ensure that the user terminal 460 is able to reliably decode the log data for use by the user terminal 460. In some embodiments, the log encoder 444 is configured to perform compression of the log data, image encoding, thumbnail image creation, or other suitable encoding protocols. In some embodiments, the log encoder 444 is configured to perform encryption of the log data. In some embodiments, the log encoder 444 is further configured to perform super-resolution to make the data more visible for the user. One of ordinary skill in the art would understand that super-resolution is a process of receiving a high-resolution image from a low-resolution image. Improving the resolution of the log data helps to reduce false positives or false negatives.

In some embodiments, the server 440 further includes a database for storing received log data. In some embodiments, the log data is stored in the database prior to and/or after encoding by the log encoder 444. In some embodiments, the log data is stored in the database in a priority queue. In some embodiments, the priority of the priority queue is determined based on a time that the object or scene, e.g., a trigger event, was detected, a time that the log data was received by the log data receiver 442, a type of the object or scene, an identity of the driver of the detecting vehicle, or other suitable priority criteria.

The log transferer 446 is configured to receive the encoded log data from the log encoder 444. The log transferer 446 is configured to transmit the encoded to the user terminal 460. In some embodiments, the log transferer 446 is configured to transmit the encoded log data to a mobile device accessible by the user. In some embodiments, the log transferer 446 is configured to transfer the encoded log data wirelessly. In some embodiments, the log transferer 446 is configured to transmit the encoded log data via a wired connection. In some embodiments, the log transferer 446 is configured to transmit encoding protocol information along with the encoded log data. Transmitting the encoding protocol information for the encoded log data helps the mobile device or the user terminal 460 to accurately decode the encoded log data for use by the user terminal 460.

The request/rule receiver 448 is configured to receive new or updated rules or requests for data from a user. In some embodiments, the request/rule receiver 448 is configured to receive the new or updated rules or requests wirelessly. In some embodiments, the request/rule receiver 448 is configured to receive the new or updated rules or request via a wired connection. In some embodiments, the request/rule receiver 448 from the UI 110 (FIG. 1).

In some embodiments, the server 440 is configured to receive location in formation from multiple vehicles. In some embodiments, the server 440 is configured to receive navigation plans from multiple vehicles. In some embodiments, the log transferer 446 is configured to limit the transmission of encoded log data to only vehicles that are within a predetermined distance of the detected trigger event.

In some embodiments, the server 440 is configured to transmit only log data associated with a newly detected trigger event. That is, if the trigger event has already been reported by the server 440, the trigger event is not reported again. Limiting the repetitive reporting of trigger event helps to reduce redundant data received by user terminals to the server 440.

The user terminal 460 is a user terminal accessible by a user associated with a fulfilled request. In some embodiments, the user terminal 460 includes a GUI. In some embodiments, the user terminal 460 is configured to automatically generate an alert in response to received data from the server 440. In some embodiments, the alert includes an audio or visual alert.

One of ordinary skill in the art would understand that modifications to the request retrieval system 400 are within the scope of this disclosure. For example, in some embodiments, the detecting vehicle system 410 is able to transmit log data directly to the user terminal 460 over a network, such as a wireless network. In some embodiments, a mobile device of an occupant in the detecting vehicle is able to transmit log data directly to the user terminal 460, such as a wireless network.

By automatically identifying and disseminating information related to satisfaction of rule or requests detected within the vehicle or in an environment surrounding a vehicle, the user is able to improve performance of applications or software executed using a processing system of the vehicle, e.g., the ECU 420. In some embodiments, the user is able to object information related to events such as accidents.

Figure 5:
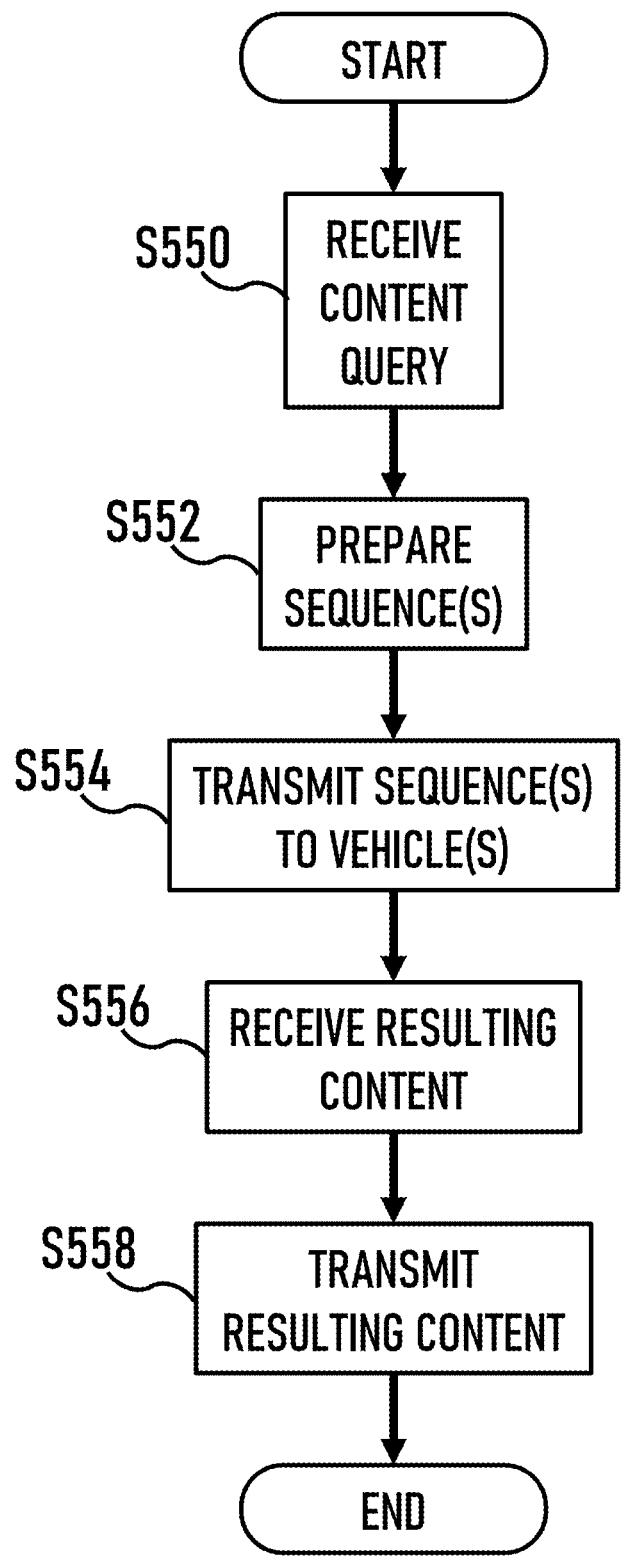
FIG. 5 is an operational flow for mobile computing network queried content capture in accordance with at least some embodiments of the subject disclosure.

FIG. 5 is an operational flow for mobile computing network queried content capture in accordance with at least some embodiments of the subject disclosure. The operational flow provides a method of mobile computing network queried content capture. In at least some embodiments, the method is performed by a server, such as server 120 shown in FIG. 1 or server 400 shown in FIG. 4. In at least some embodiments, the method is performed by a controller of the server, such as controller 1102 shown in FIG. 11.

At S550, the controller receives a content query. In at least some embodiments, the controller receives a content query from an accessible console, such as accessible console 150 shown in FIG. 1. In at least some embodiments, the controller receives a content query through user interface 200 shown in FIG. 2. In at least some embodiments, the content query is a request for information discernable from data that is collectable using sensors aboard one or more vehicles. In at least some embodiments, the content query relates to one or more classes of an ontology.

At S552, the controller prepares a program operation sequence. In at least some embodiments, the controller prepares a sequence of program operations for capturing a data sample, the data sample including first class information and second class information, and reducing the second class information of the data sample. In at least some embodiments, the controller prepares various program operation sequences. In at least some embodiments, the various program operation sequences target the same content, but differ in program operations and or combined computational resources. In at least some embodiments, the various program operation sequences target different content for a single query. In at least some embodiments, the controller performs the operational flow of FIG. 6, which will be described hereinafter.

At S554, the controller transmits sequences to one or more vehicles. In at least some embodiments, the controller transmits a program operation sequence to each of one or more vehicles. In at least some embodiments, the controller transmits various program operation sequences to a plurality of vehicles.

At S556, the controller receives resulting content. In at least some embodiments, the controller receives content from each of a plurality of vehicles at various times and through various connections. In at least some embodiments, the controller receives content in a uniform format. In at least some embodiments, the controller receives content in various formats.

At S558, the controller transmits the resulting content. In at least some embodiments, the controller transmits the content to the accessible console or other terminal from which the content query was received. In at least some embodiments, the controller transmits the content to storage for later retrieval by an accessible console or other terminal.

Figure 6:
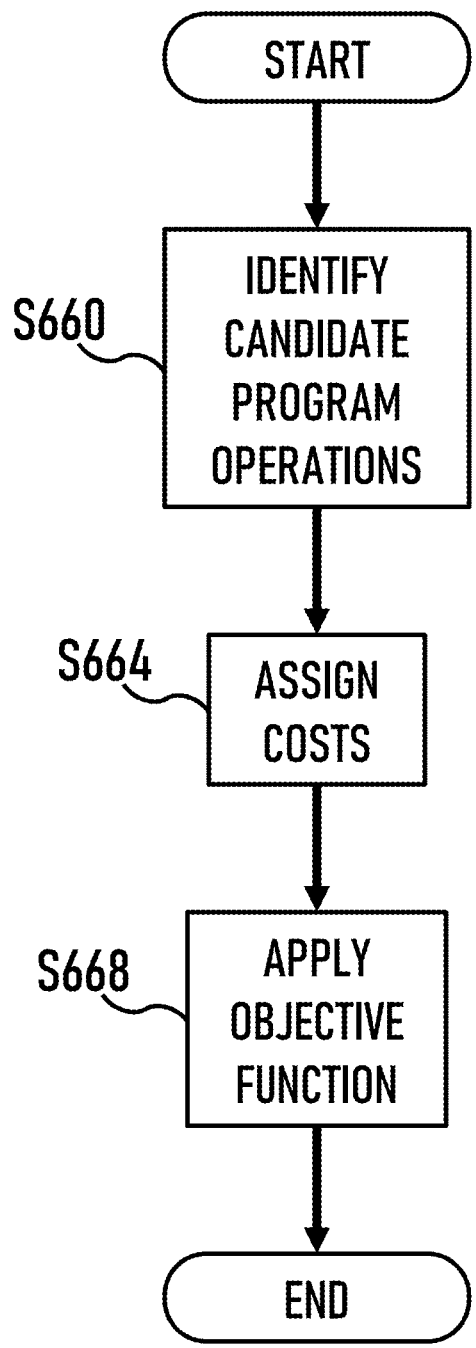
FIG. 6 is an operational flow for program operation sequence determination for reduced potential leakage of personally identifiable information in accordance with at least some embodiments of the subject disclosure.

FIG. 6 is an operational flow for program operation sequence determination for reduced potential leakage of personally identifiable information in accordance with at least some embodiments of the subject disclosure. The operational flow provides a method of program operation sequence determination for reduced potential leakage of personally identifiable information. In at least some embodiments, the method is performed by a server, such as server 120 shown in FIG. 1 or server 400 shown in FIG. 4. In at least some embodiments, the method is performed by a controller of the server including sections for performing certain operations, such as controller 1102 shown in FIG. 11.

At S660, an identifying section of the controller identifies candidate program operations. In at least some embodiments, the identifying section identifies a plurality of candidate program operations for capturing a data sample, the data sample including first class information and second class information, and reducing the second class information of the data sample. In at least some embodiments, the identifying section identifies necessary program operations and optional program operations. In at least some embodiments, the plurality of candidate program operations include at least one detecting operation, at least one compression operation, and at least one filtering operation. In at least some embodiments, the identifying section performs the identifying in response to receiving a content query from a client terminal. In at least some embodiments, the identifying section performs the operational flow of FIG. 7, which will be described hereinafter.

At S664, an assigning section assigns costs. In at least some embodiments, the assigning section assigns a cost to each valid combination of a candidate program operation among the plurality of candidate program operations and a computational resource among a plurality of computational resources. In at least some embodiments, the assigning section assigns a leakage cost representing potential leakage of personally identifiable information to each valid combination. In at least some embodiments, the assigning section assigns a monetary cost representing at least one of computational expense and transmission expense to each valid combination. In at least some embodiments, the assigning section assigns a leakage cost representing potential leakage of personally identifiable information associated with each valid combination of a candidate program operation among the plurality of candidate program operations and a computational resource among a plurality of computational resources. In at least some embodiments, the assigning section performs the operational flow of FIG. 9, which will be described hereinafter.

PII leakage potential as a cost is calculated in various ways in various embodiments. In at least some embodiments, PII leakage potential is computed in terms of monetary cost. In at least some embodiments, computing PII leakage potential in terms of monetary cost has lower accuracy and precision, but is combinable with the traditional transmission and computational costs. In at least some embodiments, PII leakage potential is represented in non-monetary terms. In at least some embodiments, representing PII leakage potential in non-monetary terms has greater accuracy and precision, but is not reconcilable with the traditional transmission and computational costs. In at least some embodiments where the cost of PII leakage potential is represented in non-monetary terms, the cost is weighted against the traditional computational and transmission costs to consider an appropriate proportion. In other words, if the PII leakage potential is given an increased weight, then the solution may favor reducing PII leakage potential over monetary cost. In contrast, if the computational and transmission cost is given an increased weight, then the solution may favor reducing monetary cost over PII leakage potential.

At S668, an applying section applies an objective function. In at least some embodiments, the applying section applies an objective function to the valid combinations and assigned costs to determine a sequence of program operations. In at least some embodiments, the applying section applies an objective function to the valid combinations and assigned leakage costs to determine a sequence of program operations, wherein each program operation of the sequence is performed by one or more selected computational resources such that the sum leakage cost is below a threshold leakage cost, and the amount of first class information is above a data threshold value. In at least some embodiments, the applying section determines a sequence of program operations, wherein the sequence is such that the sum monetary cost is below a threshold monetary cost. In at least some embodiments, the applying section performs the operational flow of FIG. 10, which will be described hereinafter.

In at least some embodiments, the objective function is to maximize the flow and minimize the cost, given a set of constraints. In at least some embodiments, the program operations have order constraints, and the computational resources also have order constraints. As such, the overall determination in accordance with at least some embodiments is a combinatorial optimization of a bipartite graph, the bipartite graph including the set of computational resources and the set of program operations. In at least some embodiments, the solution includes where nodes are matched to minimize the cost and maximize the amount of first class information that reaches the cloud server.

Figure 7:
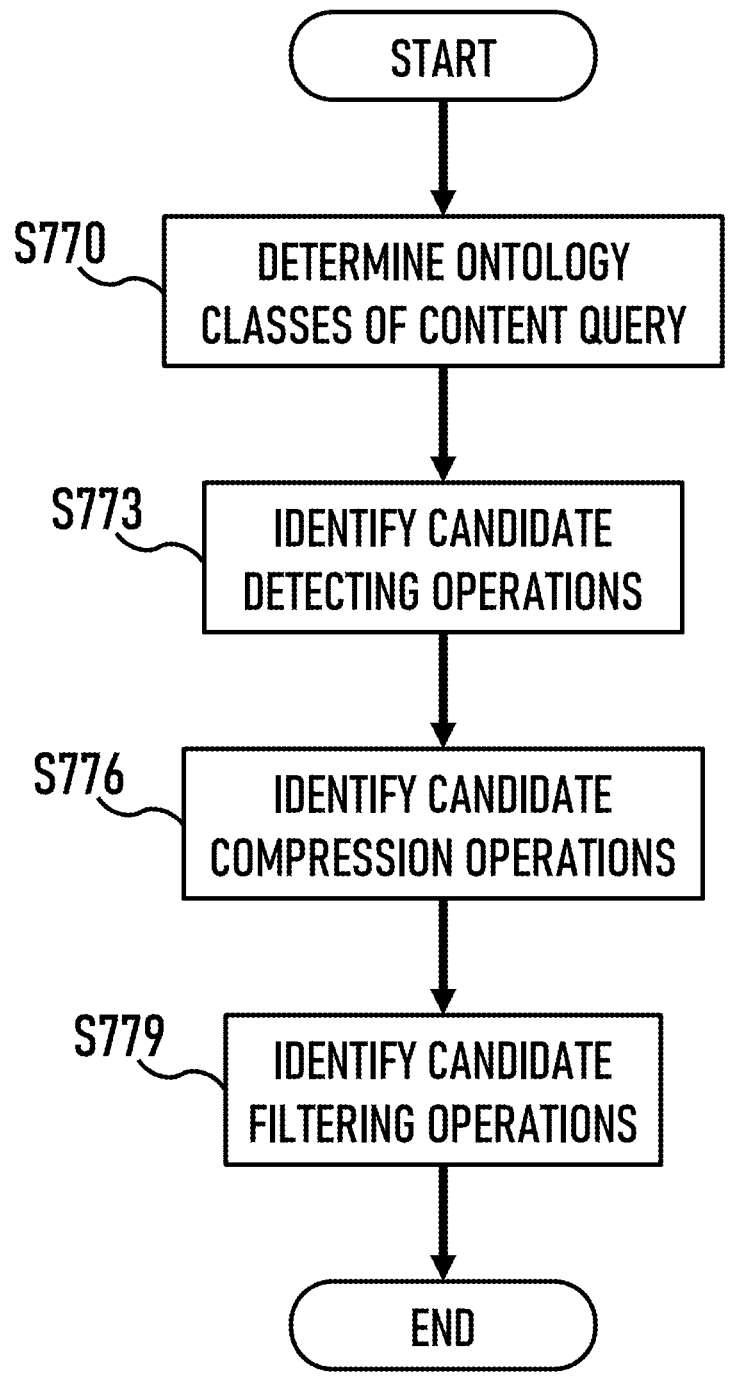
FIG. 7 is an operational flow for identifying candidate program operations in accordance with at least some embodiments of the subject disclosure.

FIG. 7 is an operational flow for identifying candidate program operations in accordance with at least some embodiments of the subject disclosure. The operational flow provides a method of identifying candidate program operations. In at least some embodiments, the method is performed by a server, such as server 120 shown in FIG. 1 or server 400 shown in FIG. 4. In at least some embodiments, the method is performed by an identifying section, such as identifying section 1120 shown in FIG. 11.

At S770, the identifying section or a sub-section thereof determines ontology classes of the content query. In at least some embodiments, the identifying section reads one or more ontology classes indicated by the content query. In at least some embodiments, the identifying section applies a model to the content query, the model configured to output ontology classes in response to input of a content query. In at least some embodiments, the identifying section performs the operational flow of FIG. 8, which will be described hereinafter.

At S773, the identifying section or a sub-section thereof identifies candidate detecting operations. In at least some embodiments, the identifying section identifies program operations configured to instruct one or more sensors to capture raw data including at least a portion of the queried content. In at least some embodiments, the identifying section identifies program operations configured to instruct one or more sensors to capture raw data collectively including the queried content. In at least some embodiments, the identifying section identifies program operations configured to instruct one or more sensors to capture raw data from which at least a portion of the queried content can be derived.

At S776, the identifying section or a sub-section thereof identifies candidate compression operations. In at least some embodiments, the identifying section identifies program operations configured to compress raw data, filtered data, or previously compressed data. In at least some embodiments, the identifying section identifies program operations configured to reduce a capacity required to store the data while preventing or minimizing loss of data.

At S779, the identifying section or a sub-section thereof identifies candidate filtering operations. In at least some embodiments, the identifying section identifies program operations configured to filter raw data, compressed data, or previously filtered data. In at least some embodiments, the identifying section identifies program operations configured to reduce a capacity required to store the data by removing portions of the data that is not relevant to the queried content.

Figure 8:
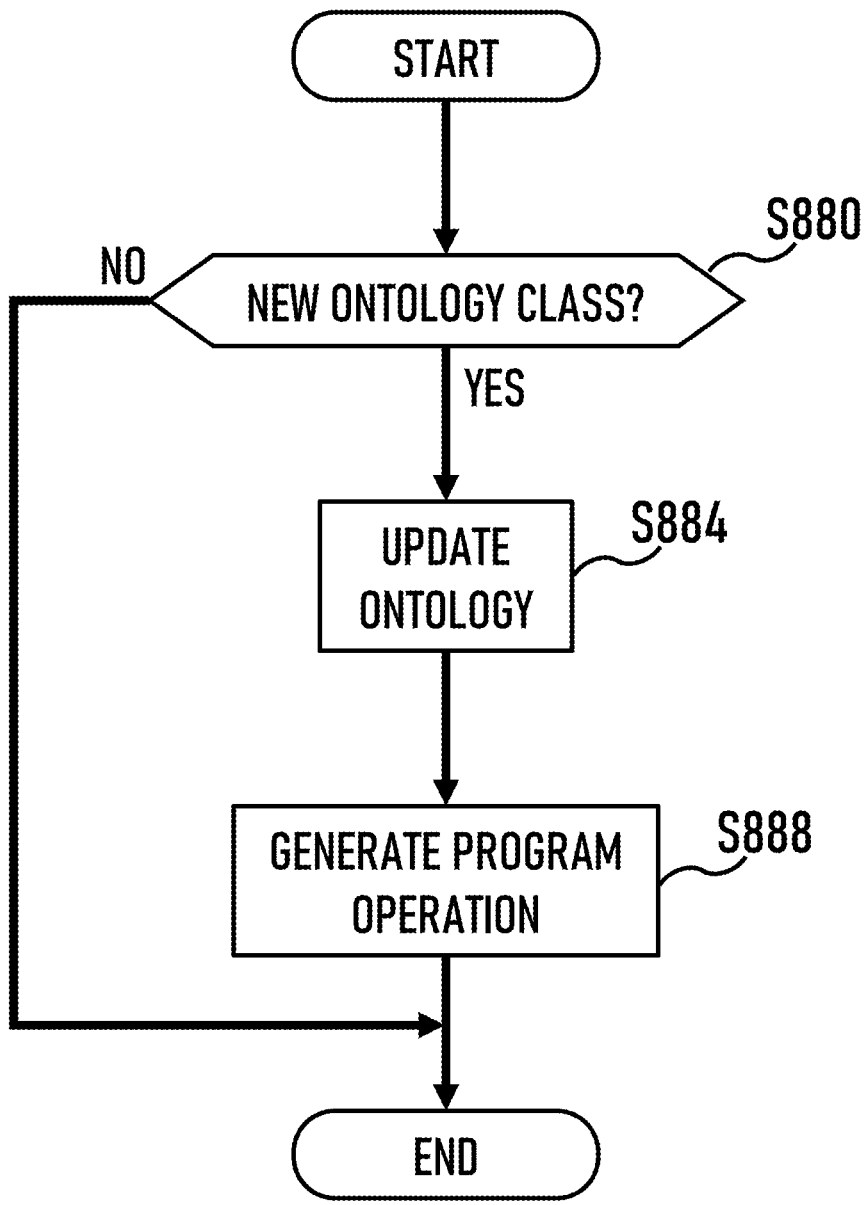
FIG. 8 is an operational flow for determining ontology classes of a content query in accordance with at least some embodiments of the subject disclosure.

FIG. 8 is an operational flow for determining ontology classes of a content query in accordance with at least some embodiments of the subject disclosure. The operational flow provides a method of determining ontology classes of a content query. In at least some embodiments, the method is performed by a server, such as server 120 shown in FIG. 1 or server 400 shown in FIG. 4. In at least some embodiments, the method is performed by a controller of the server, such as controller 1102 shown in FIG. 11.

At S880, the controller determines whether there is a new ontology class. In at least some embodiments, the controller determines whether there is a new ontology class in response to receiving one or more content queries. In at least some embodiments, the controller determines that there is a new ontology class in response to receiving an instruction to implement a new ontology class. If the controller determines that there is a new ontology class, then the operational flow proceeds to ontology updating at S884. If the controller determines that there is not a new ontology class, then the operational flow ends.

At S884, the controller updates the ontology. In at least some embodiments, the controller adds a new class to an ontology database. In at least some embodiments, the controller associates one or more program operations with the new ontology class. In at least some embodiments, the controller associates one or more previous content queries with the new ontology class.

Figure 11:
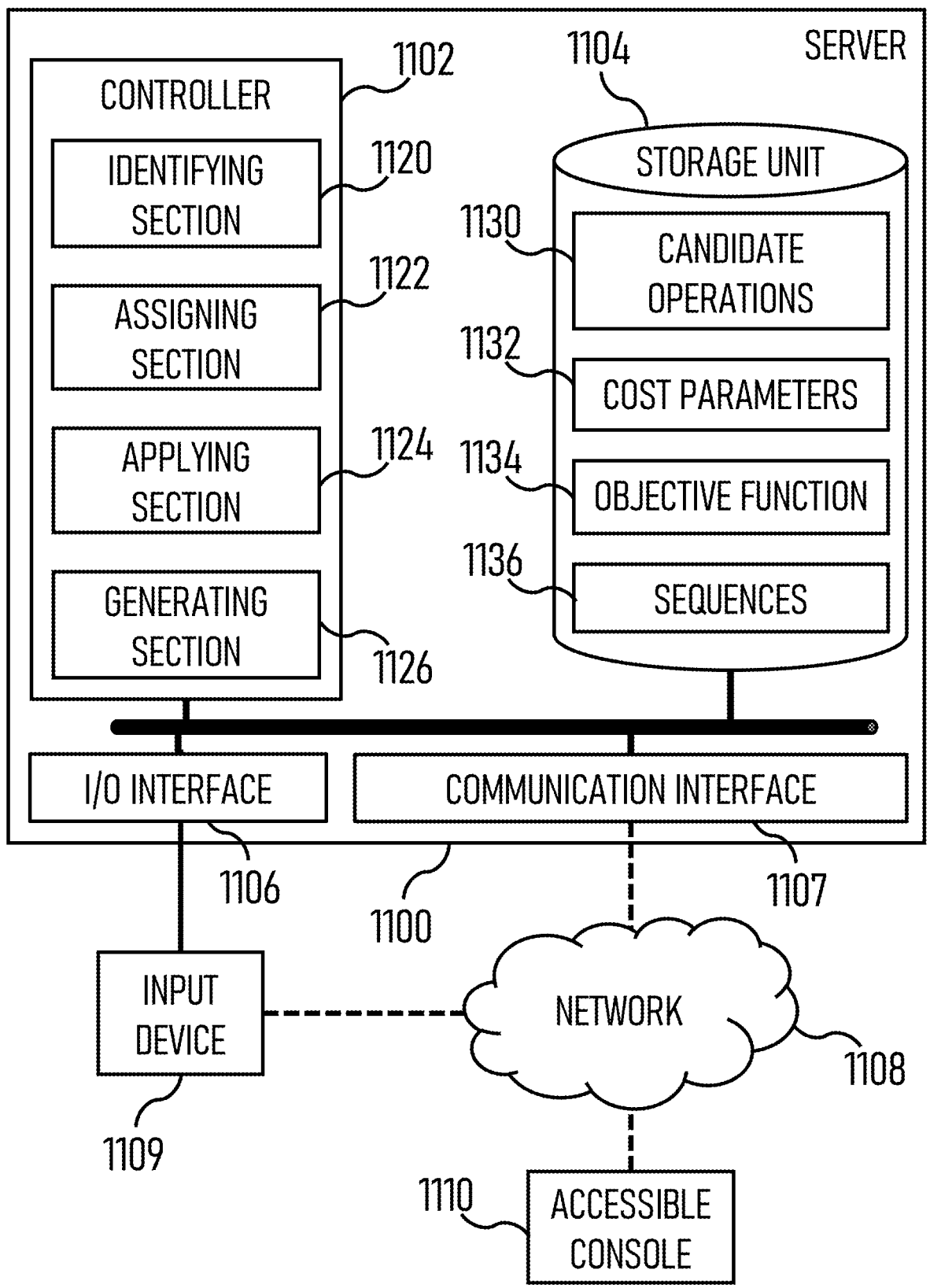
FIG. 11 is a diagram of a hardware configuration for program operation sequence determination for reduced potential leakage of personally identifiable information in accordance with at least some embodiments of the subject disclosure.

At S888, a generating section of the controller, such as generating section 1126 shown in FIG. 11, generates one or more program operations. In at least some embodiments, the generating section generates one or more program operations associated with the new ontology entry. In at least some embodiments, the generating section generates program operations in response to updating the ontology. In at least some embodiments, the generating section modifies one or more existing program operations to generate new program operations. In at least some embodiments, the generating section generates program operations to detect, compress, or filter data relevant to the new ontology class.

For a given ontology of classes, program operations are generated for obtaining applicable, useful information for each class in at least some embodiments. In at least some embodiments, the ontology of classes will be updated regularly, adding new classes and in some cases removing unused classes. As the ontology changes, so do the required program operations for gathering information relating to classes of the ontology. Therefore, at least some embodiments perform updates at regular intervals or in response to certain events, such as each time the ontology is updated. In at least some embodiments, the controller updates the ontology at regular intervals or in response to a certain amount of content queries.

Figure 9:
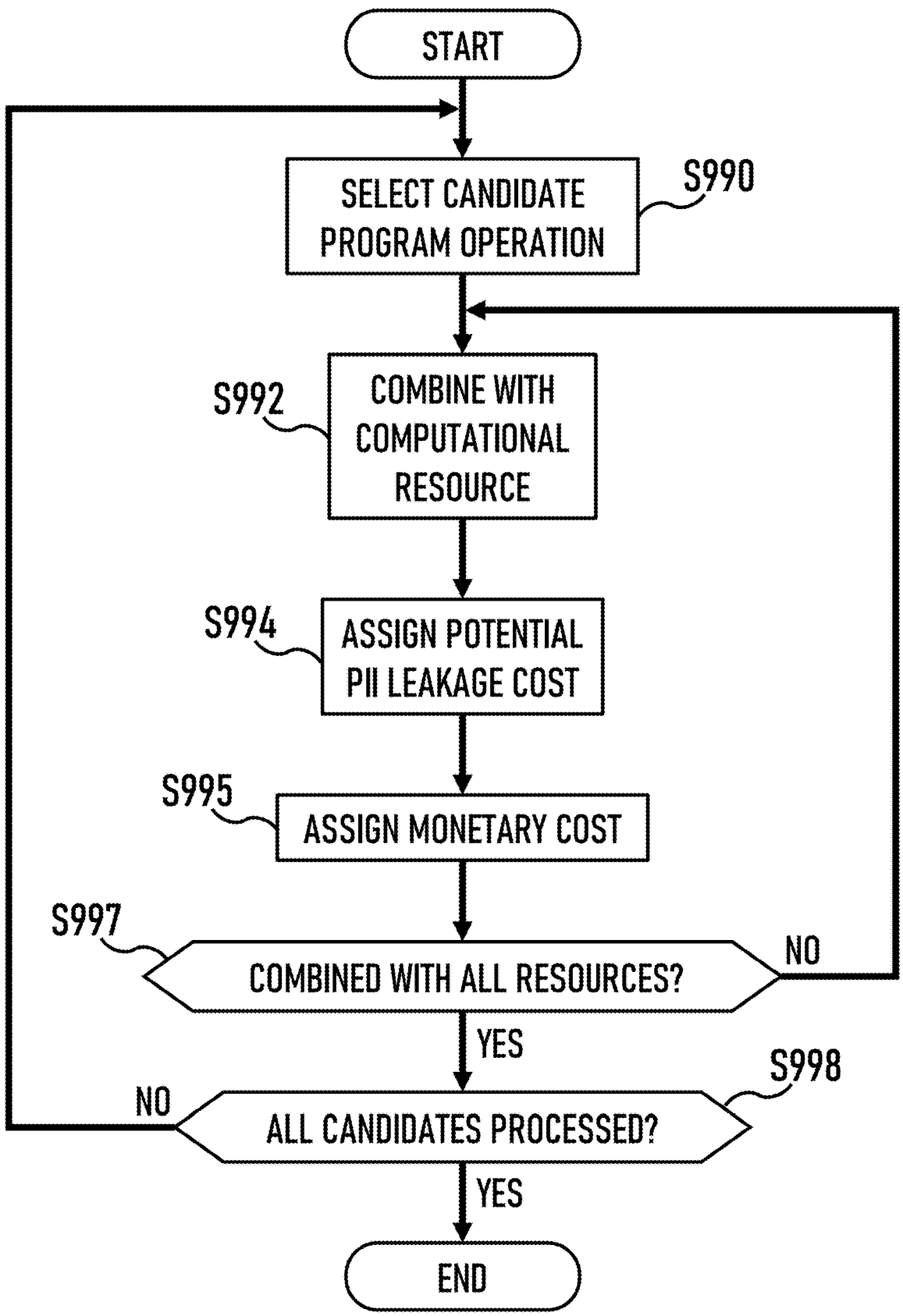
FIG. 9 is an operational flow for assigning costs in accordance with at least some embodiments of the subject disclosure.

FIG. 9 is an operational flow for assigning costs in accordance with at least some embodiments of the subject disclosure. The operational flow provides a method of assigning costs. In at least some embodiments, the method is performed by a server, such as server 120 shown in FIG. 1 or server 400 shown in FIG. 4. In at least some embodiments, the method is performed by an assigning section, such as assigning section 1122 shown in FIG. 11.

At S990, the assigning section or a sub-section thereof selects a candidate program operation. In at least some embodiments, the assigning section selects a candidate program operation among the plurality of candidate program operations identified by the identifying section. In at least some embodiments, as iterations of operation S990 proceed, the assigning section selects each candidate program operation once.

At S992, the assigning section or a sub-section thereof combines with a computational resource. In at least some embodiments, the assigning section combines the candidate program operation selected at S990 with a computational resource. In at least some embodiments, the assigning section combines the candidate program operation with a computational resource among a plurality of computational resources available in a particular vehicle along with any relevant edge and cloud computational resources. In at least some embodiments, the plurality of computational resources include at least one vehicle sensor, at least one vehicle processor, at least one vehicle memory, and at least one cloud server. In at least some embodiments, the plurality of computational resources further include at least one vehicle storage, and at least one edge computation node. In at least some embodiments, the particular vehicle is a make and model. In at least some embodiments, the computational resources include computational resources within each of a plurality of vehicles, such as a plurality of vehicle makes and models. In at least some embodiments, as iterations of operation S992 proceed, the assigning section combines each candidate program operation with each computational resource among the plurality of computational resources.

At S994, the assigning section or a sub-section thereof assigns a potential PII leakage cost. In at least some embodiments, the assigning section assigns a leakage cost representing potential leakage of personally identifiable information associated with each valid combination of a candidate program operation among the plurality of candidate program operations and a computational resource among a plurality of computational resources. In at least some embodiments, the assigning section assigns a leakage cost in units other than monetary value. In at least some embodiments, the assigning section assigns a leakage cost in units of monetary value. In at least some embodiments, the assigning section assigns a leakage cost according to an estimation of damages resulting from disclosure of PII. In at least some embodiments, as iterations of operation S994 proceed, the assigning section assigns a leakage cost to each valid combination.

At S995, the assigning section or a sub-section thereof assigns a monetary cost. In at least some embodiments, the assigning section further assigns a monetary cost of computation and transmission associated with each valid combination. In at least some embodiments, the assigning section assigns a computation cost in terms of hardware cost and/or in terms of energy expenditure. In at least some embodiments, the assigning section assigns a transmission cost in terms of network usage cost and/or in terms of energy expenditure. In at least some embodiments, as iterations of operation S995 proceed, the assigning section assigns a monetary cost to each valid combination.

At S997, the assigning section determines whether the selected candidate program operation has been combined with all computational resources. If the assigning section determines that uncombined computational resources remain, then the operational flow returns to computational resource combining at S992. If the assigning section determines that the selected candidate program operation has been combined with all computational resources, then the operational flow proceeds to candidate processing determination at S998.

At S998, the assigning section determines whether all candidate program operations have been selected. If the assigning section determines that unselected candidate program operations remain, then the operational flow returns to candidate program operation selecting at S990. If the assigning section determines that all candidate program operations have been selected, then the operational flow ends.

Figure 10:
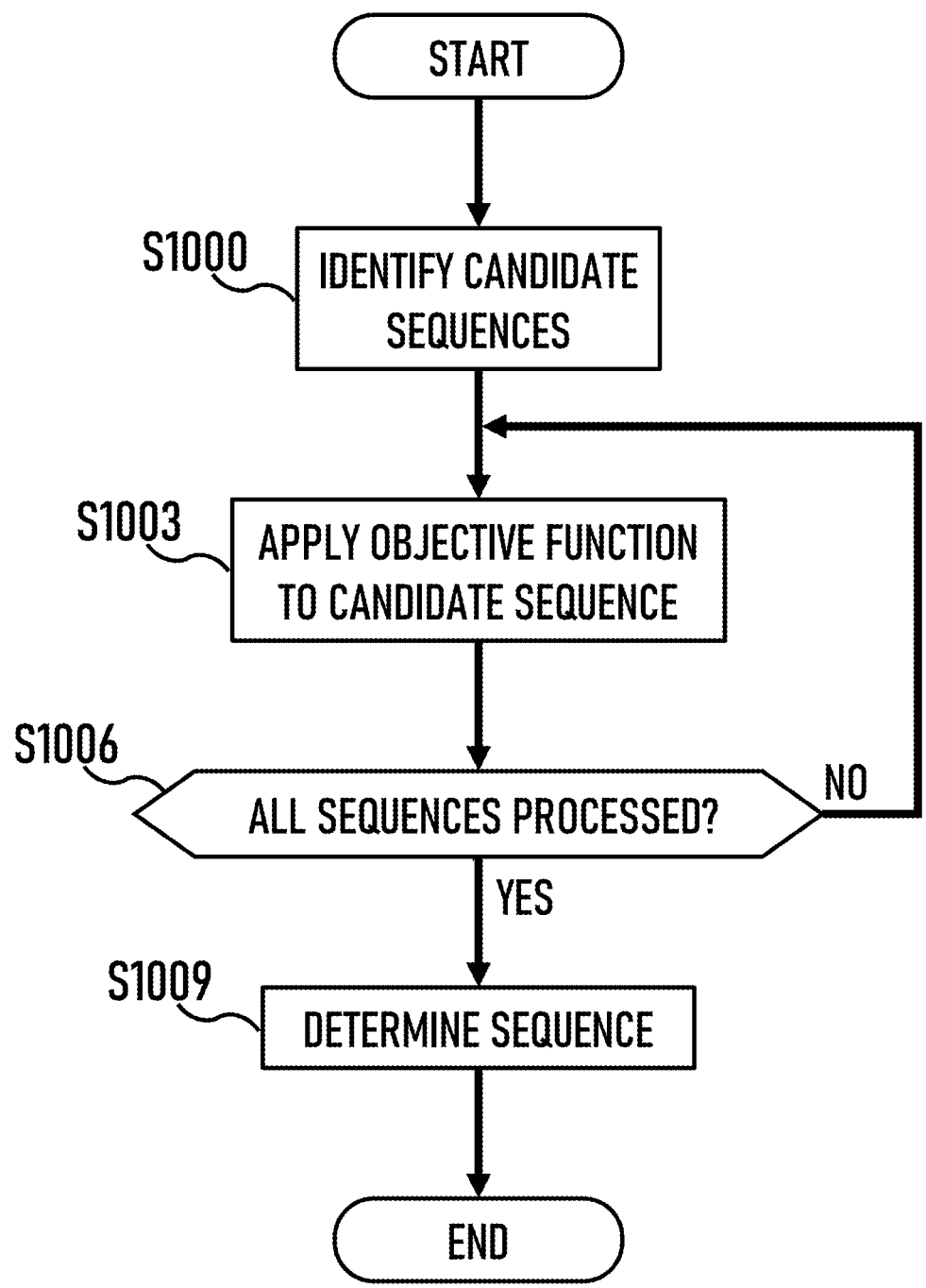
FIG. 10 is an operational flow for applying an objective function in accordance with at least some embodiments of the subject disclosure.

FIG. 10 is an operational flow for applying an objective function in accordance with at least some embodiments of the subject disclosure. The operational flow provides a method of applying an objective function. In at least some embodiments, the method is performed by a server, such as server 120 shown in FIG. 1 or server 400 shown in FIG. 4. In at least some embodiments, the method is performed by an applying section, such as applying section 1124 shown in FIG. 11.

At S1000, the applying section or a sub-section thereof identifies candidate sequences. In at least some embodiments, the applying section causes the identifying section to identify candidate sequences. In at least some embodiments, the applying section identifies potential sequences of valid combinations of candidate program operations and computational resources that capture a data sample, the data sample including first class information and second class information, and reduce the second class information of the data sample before transmitting the resulting data to the server. In at least some embodiments, the candidate sequences include varying numbers of candidate program operations. For example, one candidate sequence includes many different types of filtering and compression at various computational stages of the vehicle, while another candidate sequence forgoes most filtering and compression. In at least some embodiments, the applying section identifies every path of valid combinations from data sample capture to resulting data transmission as a candidate sequence.

At S1003, the applying section or a sub-section thereof applies the objective function to the candidate sequence. In at least some embodiments, the applying section applies the objective function to the candidate sequence to compute the sum cost. In at least some embodiments, as iterations of operation S1003 proceed, the applying section computes the sum cost of each candidate sequence.

At S1006, the applying section determines whether all candidate sequences have been processed. If the applying section determines that unprocessed candidate sequences remain, then the operational flow returns to objective function application at S1003 with the next candidate sequence. If the applying section determines that all candidate sequences have been processed, then the operational flow proceeds to sequence determination at S1009.

At S1009, the applying section or a sub-section thereof determines the sequence. In at least some embodiments, the applying section determines which sequence to transmit for execution by the vehicle. In at least some embodiments, the applying section determines to transmit for execution the candidate sequence having the lowest sum cost. In at least some embodiments, the applying section determines to transmit for execution the candidate sequence having the lowest sum leakage cost. In at least some embodiments, the applying section determines to transmit for execution the candidate sequence having the lowest sum monetary cost. In at least some embodiments, the applying section determines to transmit for execution the candidate sequence having the lowest sum leakage cost among candidate sequences having a monetary cost below a threshold monetary cost. In at least some embodiments, the applying section determines to transmit for execution the candidate sequence having the lowest sum monetary cost among candidate sequences having a leakage cost below a threshold leakage cost. In at least some embodiments, the applying section determines to transmit for execution the candidate sequence having the lowest sum cost, wherein the leakage cost is represented in the same units as the monetary cost.

In at least some embodiments, the overall determination can be made with respect to a single vehicle or a fleet of vehicles. In cases of fleets in at least some embodiments, especially those with heterogeneous capability, the overall solution output from the objective function assigns operations in a fixed manner, or in a weighted manner, such as giving a highly capable vehicle a high likelihood of being assigned a complex operation at a given opening, though a lesser capable vehicle also has a low likelihood of being assigned the complex operation.

FIG. 11 is a diagram of a hardware configuration for program operation sequence determination for reduced potential leakage of personally identifiable information in accordance with at least some embodiments of the subject disclosure.

The exemplary hardware configuration includes server 1100, which interacts with input device 1109, and communicates with input device 1109 through network 1108. In at least some embodiments, server 1100 is a computer or other computing device that receives input or commands from input device 1109. In at least some embodiments, server 1100 is integrated with input device 1109. In at least some embodiments, server 1100 is a computer system that executes computer-readable instructions to perform operations for program operation sequence determination for reduced potential leakage of personally identifiable information.

Server 1100 includes a controller 1102, a storage unit 1104, an input/output interface 1106, and a communication interface 1107. In at least some embodiments, controller 1102 includes a processor or programmable circuitry executing instructions to cause the processor or programmable circuitry to perform operations according to the instructions.

In at least some embodiments, controller 1102 includes analog or digital programmable circuitry, or any combination thereof. In at least some embodiments, controller 1102 includes physically separated storage or circuitry that interacts through communication. In at least some embodiments, storage unit 1104 includes a non-volatile computer-readable medium capable of storing executable and non-executable data for access by controller 1102 during execution of the instructions. Communication interface 1107 transmits and receives data from network 1108. Input/output interface 1106 connects to various input and output units, such as input device 1109, via a parallel port, a serial port, a keyboard port, a mouse port, a monitor port, and the like to accept commands and present information. In some embodiments, storage unit 1104 is external from server 1100.

Controller 1102 includes identifying section 1120, assigning section 1122, applying section 1124, and generating section 1126. Storage unit 1104 includes candidate operations 1130, cost parameters 1132, objective function 1134, and sequences 1136.

Identifying section 1120 is the circuitry or instructions of controller 1102 configured to identify candidate program operations. In at least some embodiments, identifying section 1120 is configured to identify a plurality of candidate program operations for capturing a data sample, the data sample including first class information and second class information, and reducing the second class information of the data sample. In at least some embodiments, identifying section 1120 records information in storage unit 1104, such as candidate operations 1130. In at least some embodiments, identifying section 1120 includes sub-sections for performing additional functions, as described in the foregoing flow charts. In at least some embodiments, such sub-sections is referred to by a name associated with a corresponding function.

Assigning section 1122 is the circuitry or instructions of controller 1102 configured to assign cost. In at least some embodiments, assigning section 1122 is configured to assign a leakage cost representing potential leakage of personally identifiable information associated with each valid combination of a candidate program operation among the plurality of candidate program operations and a computational resource among a plurality of computational resources. In at least some embodiments, assigning section 1122 utilizes information in storage unit 1104, such as candidate operations 1130 and cost parameters 1132. In at least some embodiments, assigning section 1122 includes sub-sections for performing additional functions, as described in the foregoing flow charts. In at least some embodiments, such sub-sections is referred to by a name associated with a corresponding function.

Applying section 1124 is the circuitry or instructions of controller 1102 configured to apply an objective function. In at least some embodiments, applying section 1124 is configured to apply an objective function to the valid combinations and assigned leakage costs to determine a sequence of program operations, wherein each program operation of the sequence is performed by one or more selected computational resources such that the sum leakage cost is below a threshold leakage cost, and the amount of first class information is above a data threshold value. In at least some embodiments, applying section 1124 utilizes information in storage unit 1104, such as candidate operations 1130 and objective function 1134, and records information in storage unit 1104, such as sequences 1136. In at least some embodiments, applying section 1124 includes sub-sections for performing additional functions, as described in the foregoing flow charts. In at least some embodiments, such sub-sections is referred to by a name associated with a corresponding function.

Generating section 1126 is the circuitry or instructions of controller 1102 configured to generate program operations. In at least some embodiments, generating section 1126 is configured to generate program operations in response to updating the ontology. In at least some embodiments, generating section 1126 records information from storage unit 1104, such as candidate operations 1130. In at least some embodiments, generating section 1126 includes sub-sections for performing additional functions, as described in the foregoing flow charts. In at least some embodiments, such sub-sections is referred to by a name associated with a corresponding function.

In at least some embodiments, the apparatus is another device capable of processing logical functions in order to perform the operations herein. In at least some embodiments, the controller and the storage unit need not be entirely separate devices, but share circuitry or one or more computer-readable mediums in some embodiments. In at least some embodiments, the storage unit includes a hard drive storing both the computer-executable instructions and the data accessed by the controller, and the controller includes a combination of a central processing unit (CPU) and RAM, in which the computer-executable instructions are able to be copied in whole or in part for execution by the CPU during performance of the operations herein.

In at least some embodiments where the apparatus is a computer, a program that is installed in the computer is capable of causing the computer to function as or perform operations associated with apparatuses of the embodiments described herein. In at least some embodiments, such a program is executable by a processor to cause the computer to perform certain operations associated with some or all of the blocks of flowcharts and block diagrams described herein.

At least some embodiments are described with reference to flowcharts and block diagrams whose blocks represent (1) steps of processes in which operations are performed or (2) sections of a controller responsible for performing operations. In at least some embodiments, certain steps and sections are implemented by dedicated circuitry, programmable circuitry supplied with computer-readable instructions stored on computer-readable media, and/or processors supplied with computer-readable instructions stored on computer-readable media. In at least some embodiments, dedicated circuitry includes digital and/or analog hardware circuits and include integrated circuits (IC) and/or discrete circuits. In at least some embodiments, programmable circuitry includes reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

In at least some embodiments, the computer readable storage medium includes a tangible device that is able to retain and store instructions for use by an instruction execution device. In some embodiments, the computer readable storage medium includes, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

In at least some embodiments, computer readable program instructions described herein are downloadable to respective computing/processing devices from a computer readable storage medium or to an external computer or external storage device via a network, for example, the Internet, a local area network, a wide area network and/or a wireless network. In at least some embodiments, the network includes copper transmission cables, optical transmission fibers, wireless transmission, routers, firewalls, switches, gateway computers and/or edge servers. In at least some embodiments, a network adapter card or network interface in each computing/processing device receives computer readable program instructions from the network and forwards the computer readable program instructions for storage in a computer readable storage medium within the respective computing/processing device.

In at least some embodiments, computer readable program instructions for carrying out operations described above are assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In at least some embodiments, the computer readable program instructions are executed entirely on the user's computer, partly on the user's computer, as a stand-alone software package, partly on the user's computer and partly on a remote computer or entirely on the remote computer or server. In at least some embodiments, in the latter scenario, the remote computer is connected to the user's computer through any type of network, including a local area network (LAN) or a wide area network (WAN), or the connection is made to an external computer (for example, through the Internet using an Internet Service Provider). In at least some embodiments, electronic circuitry including, for example, programmable logic circuitry, field-programmable gate arrays (FPGA), or programmable logic arrays (PLA) execute the computer readable program instructions by utilizing state information of the computer readable program instructions to individualize the electronic circuitry, in order to perform aspects of the subject disclosure.

While embodiments of the subject disclosure have been described, the technical scope of any subject matter claimed is not limited to the above described embodiments. Persons skilled in the art would understand that various alterations and improvements to the above-described embodiments are possible. Persons skilled in the art would also understand from the scope of the claims that the embodiments added with such alterations or improvements are included in the technical scope of the invention.

The operations, procedures, steps, and stages of each process performed by an apparatus, system, program, and method shown in the claims, embodiments, or diagrams are able to be performed in any order as long as the order is not indicated by "prior to," "before," or the like and as long as the output from a previous process is not used in a later process. Even if the process flow is described using phrases such as "first" or "next" in the claims, embodiments, or diagrams, such a description does not necessarily mean that the processes must be performed in the described order.

In at least some embodiments, program operation sequence determination for reduced potential leakage of personally identifiable information is performed by identifying a plurality of candidate program operations for capturing a data sample including first class information and second class information and reducing the second class information of the data sample, assigning a leakage cost representing potential leakage of personally identifiable information associated with each valid combination of a candidate program operation among the plurality of candidate program operations and a computational resource among a plurality of computational resources, and applying an objective function to the valid combinations and assigned leakage costs to determine a sequence of program operations, wherein each program operation of the sequence is performed by one or more selected computational resources such that the sum leakage cost is below a threshold leakage cost, and the amount of first class information is above a data threshold value.

Some embodiments include the instructions in a computer program, the method performed by the processor executing the instructions of the computer program, and an apparatus that performs the method. In some embodiments, the apparatus includes a controller including circuitry configured to perform the operations in the instructions.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
   identifying a plurality of candidate program operations for capturing a data sample, the data sample including first class information and second class information, and reducing the second class information of the data sample;
   assigning a leakage cost representing potential leakage of personally identifiable information associated with each valid combination of a candidate program operation among the plurality of candidate program operations and a computational resource among a plurality of computational resources;
   applying an objective function to the valid combinations and assigned leakage costs to determine a sequence of program operations, wherein each program operation of the sequence is performed by one or more selected computational resources such that the sum leakage cost is below a threshold leakage cost, and the amount of first class information is above a data threshold value.

2. The method of claim 1, wherein the assigning includes
further assigning a monetary cost of computation and transmission associated with each valid combination;
wherein the sequence is such that the sum monetary cost is below a threshold monetary cost.

3. The method of claim 2, wherein
the plurality of computational resources include at least one vehicle sensor, at least one vehicle processor, at least one vehicle memory, and at least one cloud server.

4. The method of claim 3, wherein
the plurality of computational resources further include at least one vehicle storage, and at least one edge computation node.

5. The method of claim 1, wherein
the plurality of computational resources include computational resources within each of a plurality of vehicles.

6. The method of claim 1, wherein
the plurality of candidate program operations include at least one detecting operation, at least one compression operation, and at least one filtering operation.

7. The method of claim 1, wherein
the identifying is in response to receiving a content query from a client terminal.

8. The method of claim 7, wherein
the content query relates to one or more classes of an ontology.

9. The method of claim 8, further comprising
generating program operations in response to updating the ontology.

10. A non-transitory computer-readable medium including instructions executable by a processor to cause the processor to perform operations comprising:
identifying a plurality of candidate program operations for
capturing a data sample, the data sample including first class information and second class information, and
reducing the second class information of the data sample;
assigning a leakage cost representing potential leakage of personally identifiable information associated with each valid combination of a candidate program operation among the plurality of candidate program operations and a computational resource among a plurality of computational resources;
applying an objective function to the valid combinations and assigned leakage costs to determine a sequence of program operations, wherein each program operation of the sequence is performed by one or more selected computational resources such that the sum leakage cost is below a threshold leakage cost, and the amount of first class information is above a data threshold value.

11. The computer-readable medium of claim 10, wherein the assigning includes
further assigning a monetary cost of computation and transmission associated with each valid combination;
wherein the sequence is such that the sum monetary cost is below a threshold monetary cost.

12. The computer-readable medium of claim 11, wherein
the plurality of computational resources include at least one vehicle sensor, at least one vehicle processor, at least one vehicle memory, and at least one cloud server.

13. The computer-readable medium of claim 12, wherein
the plurality of computational resources further include at least one vehicle storage, and at least one edge computation node.

14. The computer-readable medium of claim 10, wherein
the plurality of computational resources include computational resources within each of a plurality of vehicles.

15. The computer-readable medium of claim 10, wherein
the plurality of candidate program operations include at least one detecting operation, at least one compression operation, and at least one filtering operation.

16. The computer-readable medium of claim 10, wherein
the identifying is in response to receiving a content query from a client terminal.

17. The computer-readable medium of claim 16, wherein
the content query relates to one or more classes of an ontology.

18. The computer-readable medium of claim 17, further comprising
generating program operations in response to updating the ontology.

19. An apparatus comprising:
a controller including circuitry configured to perform operations including
identifying a plurality of candidate program operations for
capturing a data sample, the data sample including first class information and second class information, and
reducing the second class information of the data sample;
assigning a leakage cost representing potential leakage of personally identifiable information associated with each valid combination of a candidate program operation among the plurality of candidate program operations and a computational resource among a plurality of computational resources;
applying an objective function to the valid combinations and assigned leakage costs to determine a sequence of program operations, wherein each program operation of the sequence is performed by one or more selected computational resources such that the sum leakage cost is below a threshold leakage cost, and the amount of first class information is above a data threshold value.

20. The apparatus of claim 19, wherein the assigning includes
further assigning a monetary cost of computation and transmission associated with each valid combination;
wherein the sequence is such that the sum monetary cost is below a threshold monetary cost.

* * * * *